United States Patent
Hemphill et al.

(10) Patent No.: US 7,026,770 B2
(45) Date of Patent: Apr. 11, 2006

(54) ACTUATION DEVICE

(75) Inventors: Jeff Hemphill, Copley, OH (US);
Trevor McConnell, Rittman, OH (US);
Patrick Lindemann, Wooster, OH (US)

(73) Assignee: LuK Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 10/710,963

(22) Filed: Aug. 15, 2004

(65) Prior Publication Data
US 2005/0040783 A1  Feb. 24, 2005

(30) Foreign Application Priority Data
Aug. 16, 2003  (DE) .................................. 103 37 625
Dec. 18, 2003  (DE) .................................. 103 59 634

(51) Int. Cl.
*F16H 61/32* (2006.01)
(52) U.S. Cl. ................................. 318/9; 318/15; 180/344
(58) Field of Classification Search .................. 318/3, 318/9–15; 180/337, 344, 347
See application file for complete search history.

(56) References Cited

U.S. PATENT DOCUMENTS

| | | | |
|---|---|---|---|
| 4,664,217 A * | 5/1987 | Welch et al. ................ | 180/247 |
| 4,757,598 A * | 7/1988 | Redman ....................... | 29/560 |
| 5,966,989 A | 10/1999 | Reed, Jr. et al. | |
| 6,003,395 A | 12/1999 | Rogg et al. | |
| 6,003,649 A | 12/1999 | Fischer et al. | |
| 6,095,004 A * | 8/2000 | Ota et al. .................. | 74/336 R |
| 6,205,874 B1 * | 3/2001 | Kupper et al. ............... | 74/335 |
| 6,220,109 B1 | 4/2001 | Fischer et al. | |
| 6,327,927 B1 * | 12/2001 | Rogg et al. .................. | 74/335 |
| 2002/0108457 A1 * | 8/2002 | Berger et al. ................ | 74/335 |

* cited by examiner

*Primary Examiner*—Bentsu Ro
(74) *Attorney, Agent, or Firm*—Simpson & Simpson, PLLC

(57) ABSTRACT

The invention relates to an actuating apparatus that can be used, for example, as an actuating apparatus for a motor vehicle transmission, the select function and the shift function being guaranteed by this actuating apparatus and it being possible to effect this using exactly one electric motor, and it being possible, starting from an original gear, to alternatively engage at least three different target gears without it being necessary in between to shift into an intermediate gear.

40 Claims, 22 Drawing Sheets

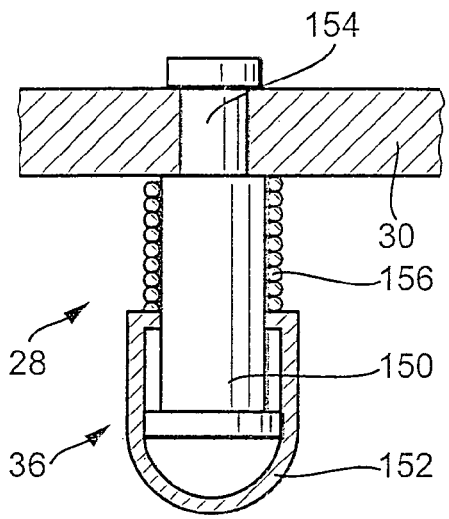
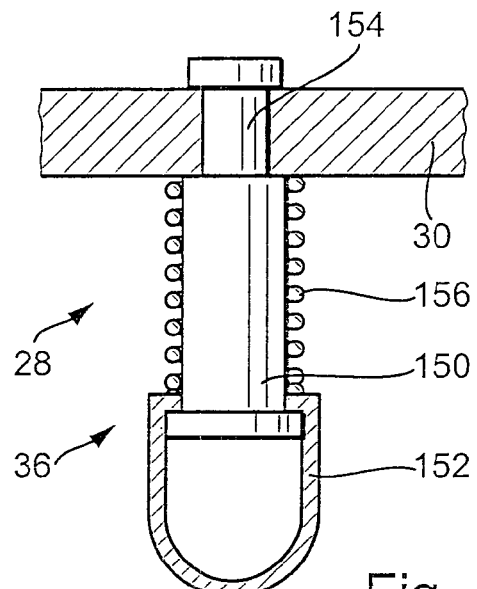
Fig. 4a      Fig. 4b
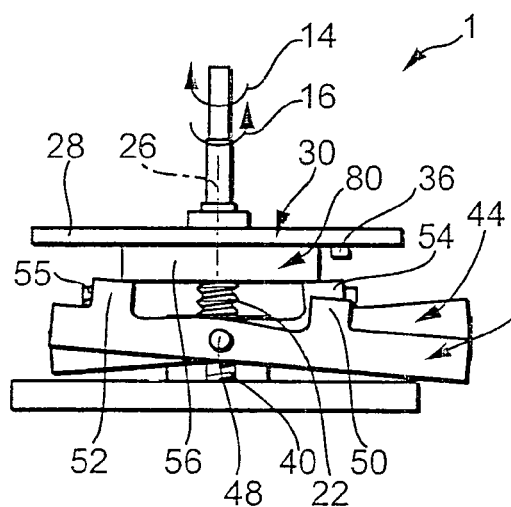
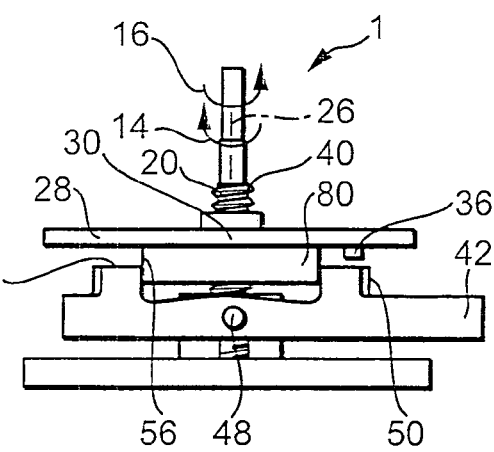
Fig. 5a      Fig. 5b

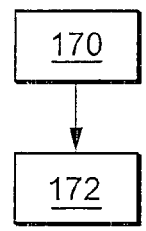
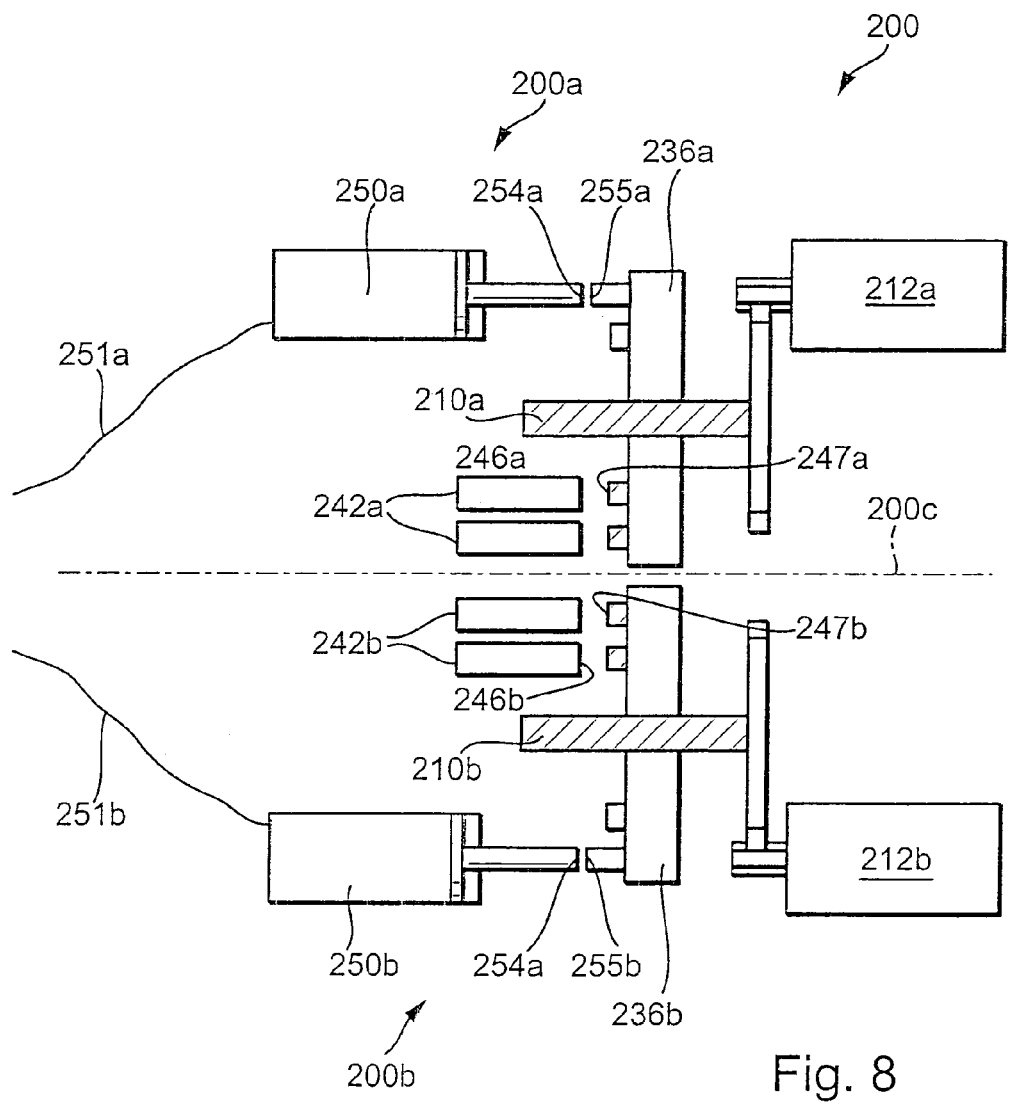

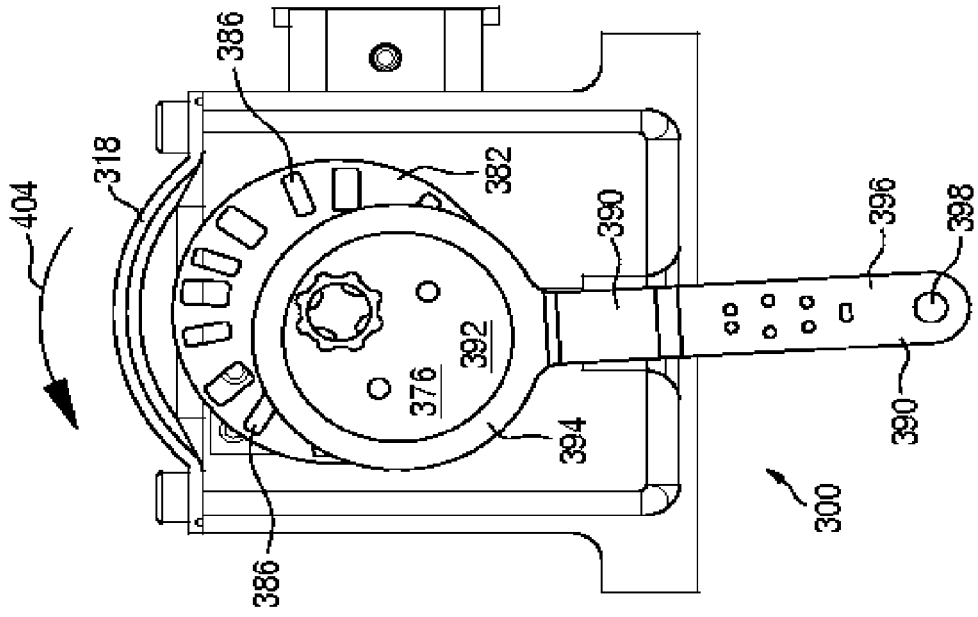
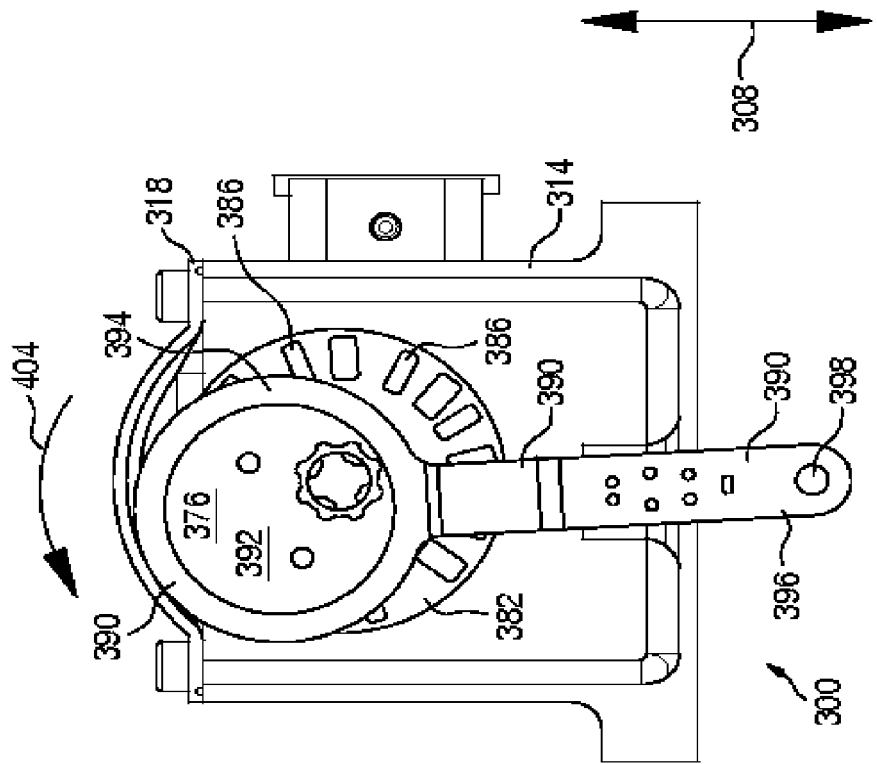
Fig. 18a
Fig. 18b

US 7,026,770 B2

ACTUATION DEVICE

CROSS-REFERENCE TO RELATED APPLICATIONS

This patent claims priority of German Patent Application No. 10337625.9, the filed Aug. 16, 2003, and German Patent Application No. 10359634.8, filed Dec. 18, 2003, which applications are incorporated herein by reference.

BACKGROUND OF THE INVENTION

The invention relates to an actuating apparatus, a use of such an actuating apparatus, a motor vehicle transmission having an actuating apparatus and a method for the automatic control of gear change processes and clutch actuations in a drive train of a motor vehicle. In a known actuating apparatus, by means of which gear change operations are controlled in an automated manner, two electric motors, each provided with an output shaft, are planned. One of these electric motors controls movements in the selection direction or in a so-called selector gate and the other of these electric motors controls movements in the shifting direction or in a so-called shifting gate or the engagement of the gears. In this design, to engage a gear the one electric motor is first used in the "selection" to move into a position in the selection direction from which the other electric motor is then used to cause a movement in the shifting direction that leads to the desired gear being engaged.

Furthermore, automated friction clutches are known that are actuated via an electrical or electro-hydraulic actuator.

OBJECTS OF THE INVENTION

The object of the present invention is to provide an actuating apparatus that can be economically produced and is operationally reliable with little design effort. According to a special aspect, the invention is based on the objective of creating a motor vehicle transmission having an actuating apparatus that can be economically produced and can be actuated in an operationally reliable manner with low design cost and to create an operationally reliable method for control of gear change operations and clutch operations in a drive train of a motor vehicle.

SUMMARY OF THE INVENTION

The invention proposes an actuating apparatus to impinge at least two shifting elements spaced apart from each other, each having at least a first engagement area for its actuation, with the following features:

A drive shaft can be driven by a motor in both rotational directions; in this context the motor can in particular be an electric motor, which, in terms of its design, can be brushless, electronically commutated, pulse-width modulated and/or provided with a transmission. In special cases, a pneumatic or hydraulic rotary drive unit can also be provided for the motor. The term motor is therefore to be interpreted as representative for all rotary drives.

The drive shaft has a first thread profile.

A positioning device is screwed onto the first thread profile of the drive shaft via a second thread profile that is complementary to the first thread profile. The complementary thread profiles are to be understood in such a way that two components are mounted on each other in such a manner that a relative axial displacement of the two parts—in this case drive shaft and positioning device—occurs when there is a rotary movement. Therefore, this may involve threaded rods with nuts, ramp profiles and the like.

A control element that is connected to the positioning device in a rotationally fixed manner causes the positioning device to be turned with the drive shaft when the drive shaft turns in a first rotational direction, at least one second engagement area provided on the positioning device being positioned on at least one first engagement area of at least one shift element. The first and second engagement areas are means that can transmit—in relation to the rotational axis of the drive shaft—an axial force and with it an axial directed movement from one component to the other component—in this case a positioning device and a shift element. The means may be, for example, integral forms, cam profiles and other elevations and recesses of the mating engagement areas.

The control element controls an axial displacement of the positioning device in relation to the drive shaft when the drive shaft turns in a second rotational direction that is opposite the first rotational direction and with it an actuation of the at least one shift element, on whose first engagement area the second engagement area is positioned.

This enables the relative axial displacement between the positioning device and the drive shaft to be limited in order to entrain the positioning device in the rotational direction upon reaching the maximum displacement when the drive shaft turns in the first rotational direction. Advantageously, a limitation of the axial displacement of the positioning device in relation to the drive shaft may be accomplished using a stop, so that when the drive shaft is driven, the control element is first displaced axially up to the stop and then is entrained by the drive shaft. To ensure this movement sequence, it may be advantageous to provide a braking device, such as a frictional device that acts in the circumferential direction, a slip clutch or the like, on the control element or on another component connected thereto in a non-rotatable manner, the braking force of the braking device being greater than a frictional force that occurs between the drive shaft and positioning device during rotation, thereby ensuring that first an axial displacement of the positioning device occurs and then an entrainment of it occurs in the rotational direction.

In this way, the drive shaft of the positioning device may be positioned on the shift element to be selected, so that an engagement area of the positioning device and an engagement area of the shift element face each other. It goes without saying that the engagement areas are disposed on the positioning device in such a manner that they face the engagement areas of a plurality of shift elements, so that, for example, a plurality of selector rails and/or a shift element may be selected for a friction clutch. For example, the positioning of the positioning device on the shift element, when there is a parallel disposition of shift rails that actuate corresponding selector sleeves to engage the gears, represents running into the selector gate and selection of a shift rail or a plurality of shift rails in the aforementioned sense. In the next actuation step, the shift elements are impinged by the positioning device by the drive shaft being driven in the opposite direction from the motor. For this purpose, the positioning device is inhibited in its turning at a position that is set beforehand. This inhibition may be accomplished using a torsional lock, for example, by a one-way clutch, a latch or the like, it being possible, in an especially advantageous manner, for there to be an inhibition of the rotary movement of the positioning device at the position at which the engagement areas of a positioning to be selected face each other. In this way, for example, the positioning device in each case can have a latching point for each gear to be shifted. It may be especially advantageous to combine the control of the individual movement operations for the positioning and the actuation of, for example, the selection and shifting of a gear into a control element with which, for example, provision can be made for a reliable return of the positioning device to the stop in the one rotational direction and a rotational inhibition at the selected position of the positioning device in the other rotational direction.

By selection of the contacting at different displacement distances of the axial displacement between drive shaft and positioning device, a timed spacing of two or more actuation operations on different shift elements may be provided during an actuation operation. For example, in this way it is possible to provide for first disengaging a selected gear and engaging a new one later in time and/or first disengaging a friction clutch, disengaging a selected gear and engaging a new gear, it being possible to overlap the actuation operations. In this case the appropriate corresponding engagement areas of the positioning device and the shift elements are appropriately coordinated with each other; that is, the corresponding shift element/positioning device engagement areas of a shift element to be actuated earlier have a generally longer axial extent than those of a shift element to be actuated later. It goes without saying that the rotary drive and with it the rotary movement of the drive shaft may be advantageously designed as a result in linear, non-linear, progressive and regressive ways and in accordance with predetermined advantageous control curves. Moreover, the rotary drive may be damped so that, for example, no abrupt rotational changes act on the drive shaft, positioning device, control elements, engagement area and/or shift elements as well as their downstream components.

In an advantageous exemplary embodiment, in particular, an actuating apparatus is proposed having a drive shaft that is rotatably mounted, said drive shaft being movable about its longitudinal axis in both rotational directions, namely in a first rotational direction and a second rotational direction opposite the first, and having a nut/threaded spindle assembly that has a threaded spindle and a nut whose thread engages the thread of the threaded spindle, it being possible for the part of this nut/threaded spindle assembly, that faces or is closer to the drive shaft in the power flow, that is, the threaded spindle or the nut, to be rotationally driven by the drive shaft, and the other part of the nut/spindle assembly, that is, the nut or the threaded spindle, being coupled to a positioning device, especially fixedly coupled, so that the axial position of the positioning device that is designed in particular in the direction of the longitudinal axis of the nut or the threaded spindle may be changed, a stop being provided that limits the axial mobility of the positioning device in the one orientation of the axial direction and it being possible to run up against the stop via turning of the drive shaft in a first rotational direction, and this stop causing the positioning device to be moved in an essentially purely rotary or swiveling manner after the stop is reached and the drive shaft continues its rotary movement in the first rotational direction, and the positioning device being designed in a rotationally asymmetric manner with respect to the rotary axis or swivel axis that is assigned to this movement and/or has a positioning element disposed in a rotationally asymmetric manner with respect to this rotary or swivel axis, the position of this positioning element in the rotational direction being changed during its purely rotational or purely swiveling movement and at least one torsional lock that acts in particular in one direction or at least one one-way clutch being provided that can hold it in at least two rotary or swivel positions of the positioning device in such a manner that in each of these holding positions, especially acting in one direction, a rotation or swiveling of the positioning device about the rotary or swivel axis is prevented if the drive shaft is driven in the second rotational rotation so that the positioning device in each case is then moved in an axial or translatory manner, especially when the rotary position remains the same, if the drive shaft is driven in the second rotational direction or is driven further.

For the sake of simplicity, this design of the present invention is described in relation to a preferred design in which the part of the nut/spindle assembly that faces or is closer to the drive shaft in the power flow is a threaded spindle and the other part of the nut/spindle assembly, the nut, faces away from the drive shaft in the power flow so that the drive shaft can load the nut via the threaded spindle, or the threaded spindle is disposed between the drive shaft and the nut in the power flow. However, this may be reversed.

Moreover, according to the invention, an actuating apparatus is proposed in particular having a drive device and having a positioning device disposed so as to be movable in relation to this drive device and movable by the drive device, the position of the positioning device being changeable in the rotational or swiveling direction and the position of the positioning device being changeable in the axial direction or in the direction of a rotational or swivel axis assigned to this rotational or swiveling direction, the drive device having exactly one motor, such as an electric motor, with an output shaft rotationally driven by the electric motor and the positioning device being driven via this output shaft both to produce the positional change of the positioning device in the rotational or swivel direction and to produce the positional change of the positioning device in the axial direction or in the direction of the rotational or swivel axis, and the position of the positioning device in the rotational or swiveling direction in at least one position of the positioning device being changeable essentially as a function of the positional change in the axial direction, or in the direction of the rotational or swivel axis via the electric motor or its output shaft, and the positioning device can be moved via this output shaft in an essentially purely translatory manner in different rotational or swivel positions in the axial direction, or in the direction of the rotational or swivel axis and/or the positioning of the positioning device in the axial direction, or in the direction of the rotational or swivel axis, being changeable in at least one position of the positioning device essentially independently of a positional change in the rotational or swivel direction and it being possible to move the positioning device in an essentially purely rotational or swiveling manner in each of the different axial positions via the output shaft. The movements that are produced via the output shaft are effected in particularly via the electric motor, which drives the output shaft. It is envisioned in particular that the electric motor can drive the output shaft in the opposite rotational direction or can be switched in such a manner that the rotational direction of the output shaft can be reversed. Preferably, it is provided that this reversal of rotational direction causes the rotational or swivel direction of the positioning device's position to be changeable or reversible independent of a change in the axial position of the swivel device. It is provided in particular that the exactly one electric motor effects or controls all movements of the actuating apparatus.

Moreover, according to the invention, an actuating apparatus for a motor vehicle transmission is proposed, said motor vehicle transmission having a plurality of gear steps with different ratios, it being possible to change a gear or the gear selected in the power or torque flow of the motor vehicle transmission using an actuating apparatus, this actuating apparatus producing positioning movements during operation that enable this gear change and these positioning movements further being such that it is possible to shift from at least one selected gear step, alternatively, into at least three different other gears, that is, without it being necessary in the meantime to select or run through an additional gear, the actuating apparatus having exactly one electric motor that effects all positioning movements of the actuating apparatus. Preferably, a positioning device is also provided for this design. It is provided in particular that there exists a selection possibility for at least one gear in which it is possible to shift from at least three other gears, it being possible to shift into each of these three gears via the exactly one electric motor. It may be provided, for example, that it is possible to shift from the second gear via the actuating apparatus and via the exactly one electric motor directly into the first, third or fourth gear without having to shift in the interim into another gear in each case. In this example, it is therefore not necessary when shifting from first to third gear, to go, for example, from first to second gear in order to then be able to shift into third gear; in this example, rather, it is possible to shift directly from first into third gear. However, the "direct" shifting in this connection is not to be understood such that no gear at all may be engaged in the interim when shifting. Rather, it is preferably provided that when shifting directly from one gear into another both of these gears are disengaged, or "neutral" is selected in the transmission.

The actuating apparatus is preferably a motor vehicle transmission actuating apparatus or a component of one. In this context it is provided in particular that gears of a motor vehicle transmission can be shifted via this motor vehicle transmission actuating apparatus. In an especially preferred way, it is provided in this case that these gears may be shifted as desired into the next higher or next lower gear, or in such a manner that the next higher or next lower gear is skipped; it may in particular be provided in this context that a plurality of next higher or next lower gears may be skipped. Thus, it is preferably provided that the sequence of gears that can be selected is not so fixed—especially due to the mechanical design of the actuating apparatus—that from each gear it is possible to shift directly into two other gears. However, there may also be locks that prevent the direct shifting between certain gears. Such locks can be, for example, of a mechanical type or—if appropriate control means, such as an electronic control device, are provided—of an electric or electronic type. Moreover, it is preferred that the gears or gear steps can be shifted in any desired sequence. However, it may be provided that the direct shifting between certain gears is hindered or blocked. Such a lock or hindrance may also be dependent on direction so that, for example, a direct shifting from one specific gear into another specific gear is not blocked or is not hindered, but shifting from the other into the first is. This hindrance or blocking can be realized, for example, mechanically or electronically—for example, via a control device that controls the electric motor—which is preferable.

The motor vehicle transmission or the motor vehicle transmission device may, for example, be a transmission device that is actuated automatically or actuated in a manually automated manner. The motor vehicle transmission or the motor vehicle transmission actuating apparatus is in particular graduated. For example, the motor vehicle transmission or the motor vehicle actuating apparatus is an automated shift transmission (AST) or a parallel shift transmission (PST) or a continuously variable shift transmission (CVT).

An actuating apparatus according to the invention may be used for very different applications. For example, an actuating apparatus according to the invention may be used for seat adjustment, and in particular for electrically controlled seat-adjustment systems, such as those that can be used in a motor vehicle. An actuating apparatus according to the invention can also be used, for example, for actuation or adjustment or control of sunroofs or sliding roofs and in particular such as are actuated by electrical control and/or can be used in a motor vehicle. An actuating apparatus according to the invention can also be used for different other actuation systems, and in particular for such as are required for the different movements, and in particular different movements that can be decoupled from each other.

Without the invention having to be restricted in the process, different preferred and exemplary embodiments of an actuating apparatus according to the invention are described in the following with reference to an actuating apparatus for a motor vehicle transmission. However, this does not mean that these preferred and exemplary designs are to be restricted to actuating apparatus for a motor vehicle transmission, designs as an actuating apparatus for a motor vehicle transmission being especially preferred.

Preferably, the actuating apparatus has exactly one electric motor. This electric motor in this context has an output shaft or drive shaft, it being possible to drive or shift this shaft or this electric motor in such a manner that this output shaft is loaded and driven in a first rotational direction or in a second rotational direction opposite the first. In this context, the electric motor or the mechanism or the drive shaft can thus be operated in reverse or the opposite direction. It is provided in particular that by means of the actuating apparatus, both selected movements and shift movements of a motor vehicle transmission device can be effected by means of the actuating apparatus, and in particular by means of the forward and reverse movement, or the movement in the opposite directions, or rotational directions of the mechanism or the electric motor or the drive shaft.

The motor vehicle transmission actuating apparatus can have a stop, in particular a physical stop for the nut or the positioning device that is disposed, for example, on the threaded spindle. This stop is formed and disposed in particular in such a manner that the nut or the positioning device—if the stop position has not yet been reached—is first moved along the threaded spindle and then against this stop by a turning of the drive shaft or motor output shaft. It may be provided that the nut abuts against the stop or that the positioning device abuts against the stop. It may also be provided that another component abuts against the stop and the action is passed on to the nut or positioning device. If the stop position is reached, the nut or the positioning device, when the drive shaft or motor output shaft is turned further in the first rotational direction is moved in particular in an essentially purely rotary manner or turned or swiveled along with the (moved) spindle so that the nut or the positioning device is essentially held axially in its position relative to the threaded spindle. It may also be provided that an elastic element, especially a spring element and/or a damping element is disposed on the stop or is positioned between the stop and the nut or the positioning device is positioned in the stop position.

By turning the positioning device in the stop position, it is possible—in particular in a controlled manner and/or in a manner monitored by a position detection device—to run up to or to control in relation to a predetermined rotary position or a rotary position that lies within a predetermined rotary position area. In this way, an appropriate gear or a gear to be selected can be chosen with the motor vehicle transmission actuating apparatus. Thus, by turning the positioning device in the stop position, the selection function for motor vehicle transmission actuating apparatus can be effected in particular by turning the positioning device into the stop position.

The motor vehicle transmission actuating apparatus may have a torsional lock or a one-way clutch that has a separate holding or lock position for a plurality of gears that can be selected in the motor vehicle transmission. Preferably, the torsional lock is a torsional lock acting in one direction or the one-way clutch is a one-way clutch acting in one direction, so that a movement is released in one direction or orientation and in the opposite direction or orientation a mobility is blocked or a movement is inhibited. In particular, for each selectable gear a separate holding or lock position may be provided. The particular holding or lock position can be such that a positioning device that has, for example, a control element, such as a plate, and a control element joined to this plate, such as bolts or pegs or the like, in the lock position for a rotary movement, which is in particular a rotary movement about a longitudinal axis of this positioning device, is inhibited in at least one orientation. This can in particular be such that, during a rotary movement of the drive shaft or motor output shaft in a second rotational direction, the positioning device is loaded via the nut/threaded spindle assembly and in particular corresponding to the threaded spindle both in the longitudinal direction of the positioning device as well as also in the rotational direction about a longitudinal axis of the positioning device, the torsional lock or the one-way clutch preventing the positioning device from turning about its longitudinal axis and in a particular lock position thereby allowing it to move only axially.

The torsional lock or the one-way clutch may, for example, be such that the positioning device, after the pertinent holding or lock position has been reached, is held in the lock position or its rotary position over the axial displacement range that remains until an axial position of the positioning device at which a shift element is actuated or loaded by this positioning device in such a manner that the engagement of a gear is effected in a transmission device when the drive shaft or motor output shaft rotates in the second rotational direction.

The torsional lock or the one-way clutch may be such that one or more profiles with recesses and elevations are provided on the positioning device, a latching element formed as a spring or linked with a spring mechanism or loaded by a spring mechanism being held on this profile—or possibly in intermediate areas between such profiles—or can engage in this profile. For example, such a profile can be provided on a casing wall extending around the longitudinal axis. The torsional lock or the one-way clutch can be designed differently. The cooperation of the latching element with the profiling or the particular design or the torsional lock or the one-way clutch in this context is in particular such that there is a plurality of stop positions in which the rotary mobility of the positioning device is blocked in at least one orientation. This is preferably the orientation that is set opposite the orientation in which the positioning device in the aforementioned stop position can be moved about its longitudinal axis in a purely swiveling or purely rotational manner or rotated or swiveled for selection.

In particular, it is provided that the torsional lock or the one-way clutch blocks a rotational movement of the positioning device or the positioning device is moved into a stop position if the drive shaft or motor output shaft is rotated in the second rotational direction.

It can also be provided that, by selection or turning of the positioning device in the stop position, a rotational position of the positioning device is run against that is such that, in a subsequent rotary movement of the drive shaft or motor output shaft in the second rotational direction, the positioning device is not yet blocked at first in the rotational direction and then in a stop position, the torsional lock or the one-way clutch is moved. It may also be provided that the positioning device, during the aforementioned subsequent rotary movement of the drive shaft or motor output shaft in the second rotational direction, is directly in a stop position blocking the rotation at least in one direction.

The torsional lock, or the one-way clutch can be such that it slips if the drive shaft or motor output shaft is rotated in the first rotational direction. It can also be such that it only slips if the positioning device is in a stop position and when the drive shaft or motor output shaft is moved essentially purely rotationally in the first rotational direction. It can also be provided that the torsional lock or the one-way clutch exerts a certain holding force on the nut or the positioning device in the circumferential or rotational direction even when the drive shaft or motor output shaft rotates in the first rotational direction. This can be, for example, a holding force based on the friction principle. It can be provided, for example, that a thread friction acts between the nut and the spindle when the drive shaft or motor output shaft rotates in the first rotational direction—especially outside of a stop position of the positioning device—and the identified holding force compensates the portion of the threaded friction that acts on the nut or the positioning device. This can be such that the positioning device is moved in an essentially purely translatory manner up to the stop position during this movement of the motor output shaft or drive shaft. However, it can also be achieved in another way or omitted.

It is provided in particular—especially after the selection—that, by rotation of the drive shaft or motor output shaft in the second rotational direction, the positioning device is moved along the spindle in the axial direction—especially under the effect of a torsional lock or a one-way clutch—in an essentially purely translatory manner and in this way a position is reached in which it actuates a shift element in such a manner that a specific gear is selected or engaged in the motor vehicle transmission. Such a shift element can, for example, be a swiveling lever. The shift element or the swiveling lever can also be coupled to one or more additional elements such as selector rails and/or actuation rods and/or shift forks and/or sliding sleeves or the like. It may be provided, for example, that one shift element, or each shift element, such as a swiveling lever, is coupled to the selector rail that pushes an assigned synchronization ring when actuated via the positioning device in order to effect a synchronization in the transmission and a shift into the pertinent selected gear.

It is provided in particular that a predetermined gear of the motor vehicle transmission, in particular one to be selected, is assigned, especially uniquely assigned, to the shift element and/or the rotary position of the positioning device or control element at which this shift element is actuated by the positioning device to shift into a gear, and/or the contact area in which the positioning device loads this shift element. Preferably, there is such an assignment, especially uniquely, for each gear that can be shifted in the motor vehicle transmission.

The positioning device can actuate the shift element, for example, via a positioning element, such as bolts or pins or the like, in order to trigger or effect a synchronization and/or the shift into a gear in the motor vehicle transmission.

Furthermore, it is preferable that at least one elastic element is provided that is loaded during the synchronization within the context of engaging a gear. This elastic element is preferably pre-tensioned. It may, for example, be a spring or an energy-storing device. A shifting elasticity can be effected via such an element. It may be provided that a shifting elasticity is effected by a control element of the positioning device, such as a bolt or pin or the like, being loaded by a spring, especially with an appropriate force. For example, the positioning device can have a control element such as a plate as well as a positioning element and a spring—especially a pre-stressed one—that is supported on the one hand against the positioning element and on the other hand against the plate. In this context, the spring can, for example, load the positioning element, especially with an appropriate force. Regarding additional exemplary designs and other exemplary systems and exemplary effects that can be achieved using such elastic elements, refer to U.S. Pat. Nos. 6,003,395; 6,220,109; and 6,003,649, which are accomplished in this respect by reference to the subject matter of this patent and also preferably show further developments of the invention.

Preferably, an additional positioning device is provided that removes or guarantees predetermined gears of the motor vehicle transmission so that they are not engaged or removed before shifting into a predetermined gear, especially a previously selected gear, of the motor vehicle transmission; this add-on device may in particular be a so-called active interlock device.

The additional positioning device may be designed in such a manner that it removes all gears of the motor vehicle transmission and/or guarantees that no gear is engaged in the motor vehicle transmission; the add-on device can also be such that it removes only certain gears of the motor vehicle transmission or guarantees that these specific gears are not engaged in the motor vehicle transmission. Which concrete gears are affected in the latter case may also depend on the gear to be shifted or selected. It may be provided, for example, in a parallel shift transmission (PST) that the additional positioning device removes all even gears of the motor vehicle transmission and/or guarantees that no even gear is engaged in the motor vehicle transmission, if there is to be a shift into an even gear or a specific even gear was selected; corresponding provision can be made for all odd gears. In an automated shift transmission (AST) it may be provided, for example, that the additional positioning device removes all gears and/or guarantees that all gears are removed before there is a shift into a new one or before it is engaged or before synchronization within the context of the shift in the motor vehicle transmission is initiated or carried out.

The additional positioning device can be fixedly coupled, for example to the positioning device and in particular fixed in terms of axial and rotational movement. The additional positioning device can have or be a control element, for example, in the form of a plate or interlock plate. The plate or interlock plate may be designed, for example, essentially in the shape of a circle or sector or can be shaped differently. It can have, for example, a collar that sticks out from an essentially flat part or from an essential flat part extending from the plate. Such a collar can, for example, be an essentially cylindrical wall or a cylindrical wall segment. The plate or interlock plate and/or a collar or a wall segment or a wall of the additional positioning device may have recesses or openings. Such openings or recesses may be provided, for example, so that a shift element formed as a swiveling lever can swivel, for example, with an essentially centrally arranged swivel axis, with its section in the area of this recess being disposed on the one side of the swivel axis; this can be expedient especially with regard to such a swiveling lever that is actuated when shifting into the selected gear, especially in the notch made in the other side of the swivel axis. It may also be provided that a plate has an end region adapted for this purpose that in particular is not a radially outwardly designed end region.

The additional positioning device may be designed and disposed, for example, in such a way that it can disengage gears via areas that are disposed radially outwardly.

Shift elements designed as swiveling levers may, for example, have a projection on both sides of a swiveling axis. In such a design it may be provided, for example, that one of these projections is more closely situated to the additional positioning device than the other if this swiveling lever is in a position at which a gear that is assigned to this swiveling lever is engaged in the motor vehicle transmission. It may be provided that the additional positioning device engages in this projection that is situated more closely to it in order to disengage the pertinent gear and thus effects a swiveling in the direction of the neutral position of the swiveling lever. The additional positioning device can further be such that it then engages—with a collar, for example—between the projections of this swiveling lever. This engagement may be such that a swiveling of this swiveling lever is blocked or hindered in the direction of an engaged gear. Regarding unengaged gears, it may be provided, for example, that the additional positioning device directly engages this swiveling lever between such projections, that is, without swinging the swiveling lever in question in the "neutral" direction beforehand. By virtue of this design of the swiveling lever or shift element and the additional positioning device, and in some cases the rotary position of the additional positioning device, it is possible to determine which gears are disengaged at the time, or regarding which gears the additional positioning device is guaranteeing to be disengaged.

It may be provided that such an additional positioning device effects or guarantees that predetermined gears are disengaged while the drive shaft or motor output shaft is moved in the second rotational direction. For example, it may be provided that the additional positioning device is first moved via the movement of the drive shaft or motor output shaft in the second rotational direction and then—with the movement of the drive shaft or the motor output shaft halted—the disengagement of predetermined gears is effected or guaranteed so that it effects or guarantees this during the aforesaid movement of the drive shaft or motor output shaft; it may also be provided that the additional positioning device also guarantees this if the drive shaft or motor output shaft is no longer moved or at least begins to be moved in the opposite direction.

Preferably, a displacement measurement device is provided that may have, for example, an incremental displacement sensor. Such an incremental displacement sensor may be provided, for example, in the area of the drive shaft or in the area of the motor. It may be provided that both the rotary position of the positioning device and the axial position of the positioning device are determined in this way.

Preferably, the rotary position of the positioning device may be determined using the displacement measurement device, it being possible—especially in a design in which the displacement measurement device has an incremental displacement sensor—to provide a reference position of the actuating apparatus by which the incremental displacement sensor or the displacement measurement device may be calibrated. This may be the case, for example, so that the positioning device, in a manner described elsewhere in this patent, is moved against a stop, which blocks its mobility in one orientation of its axial direction. Thus, in one position in the rotary direction an element may be provided that also blocks the mobility in the other orientation of its axial direction. It is possible to run to or search for this position, especially using electronic control. If this position has been found, the incremental displacement sensor or the displacement measurement device may be set—especially automatically—to a predetermined start value, such as "zero", and begin to count anew.

In a preferred design, a device, especially a guiding device, is provided that reduces the load of the thread on the positioning device or the nut and/or the thread on the threaded spindle, and particularly as regards any lateral loading that there may be and/or any torque load about an axis positioned perpendicular to the longitudinal axis of the nut or the spindle or the positioning device. A guiding device may be provided, for example, that supports the positioning device in intercepting loads of this type. Such a guiding device may be disposed essentially concentrically to the threads that engage each other. They may be provided, for example, with a guide bushing, such as a plain bearing guide bush. It may be provided in particular that shoulders or ring shoulders or cylindrical elements or other kinds of projections are provided on the positioning device and on a housing that prop against each other, a bushing, such as a plain bearing bush, being provided in the space—especially radial space—between the shoulders or cylindrical elements, whichever the case may be.

An electronic control device, such as an electronic transmission control device, may be provided that controls an electric motor of the actuating apparatus. It is preferably provided that the actuating apparatus according to the invention has exactly one electric motor. In this context it is provided in particular that this electric motor controls both the select movement and the shift movement, especially the shift into gears of a motor vehicle. Especially preferably, exactly one electric motor drives all movements of a control device. In this context it is to be provided in particular that the sequence of the gears to be shifted can be selected by corresponding drive of the electric motor. It is preferably provided in this context that the mechanical design of the actuating apparatus enables a shifting of the gears in any desired sequence.

Preferably, for a motor vehicle transmission actuating apparatus according to the invention, the shift functionality and the selection functionality is integrated on the same shaft, especially a drive shaft or on the same electric motor, the forward and backward movement of this mechanism or shaft or motor being used in particular for this purpose. A motor vehicle transmission actuating apparatus according to the invention may be such that, compared to the known motor vehicle transmission actuating apparatus on an electric motor, the two electric motors provided there may be omitted, it being possible in particular to maintain the select functionality and the shift functionality.

It may be provided that a plate or shift plate or selector plate or changeover plate of the positioning device provided in a preferred design and/or a plate or interlock plate of an additional positioning device in a preferred design and/or a latching element of a torsional lock that acts in particular in one direction or a one-way clutch that acts in particular in one direction is made of sheet metal. However, these components may also be manufactured in another way or designed differently.

Preferably, it is provided that the torsional lock that acts in particular in one direction or the one-way clutch that acts in particular in one direction for a motor vehicle transmission actuating apparatus has or provides a separate stop position for each gear that can be engaged in a motor vehicle transmission device for the positioning device, it being provided in particular that a unique assignment is given between these stop positions and the gears.

In the following, another actuating apparatus or motor vehicle transmission actuating apparatus according to the invention or a preferred design of an actuating apparatus or motor vehicle transmission actuating apparatus according to the invention is described: since the forward and backward movement of a mechanism, especially a motor, such as an electric motor, is used, or the rotational movement in a first and second rotational direction of a drive shaft or motor output shaft, a plate, which is also called a selector or shift plate or changeover plate, is moved up and down and back and forth along a threaded spindle, thereby effecting the selection and shift movement. In one direction the plate migrates downward along the threaded spindle and engages, in particular via a bolt or pin or peg or projection or means formed in another way, in a swiveling lever that is connected to a selector rail or shift actuator rod and thereby shifts the gear or shifts into the gear. In the other or opposite direction, a nut or the plate migrates upward along the spindle until the nut or the plate reaches a stop or a physical stop on the threaded spindle that enables the plate to turn, swivel or rotate and select a gear or an appropriate gear. At this position the plate can therefore turn or swivel and be positioned via a swiveling lever for the desired changeover or shift or gear. During or after the reversal of the mechanism or rotational direction of the input shaft, a mechanism or a one-way clutch acting in one direction hinders the plate from turning and the plate moves downward along the spindle in order to select the new gear. It may be provided in particular that the mechanism or one-way clutch that acts in one direction hinders the plate from turning during the shift process or shift movement. The rotation of the plate is such that it can press—in particular as desired—on both sides of the swiveling lever and therefore or thereby can move the swiveling lever (and with it a selector rail and/or a shift actuation) in two directions. Therefore, the shift and select movements may in particular be achieved by reversing the mechanism or the rotational direction of the drive shaft or the motor. It is provided in particular that the shift and select movements are combined by the same or exactly one electric motor being used. It may also be provided in this case that an active interlock design and/or a shift elasticity is provided or integrated. An active interlock design may be provided, for example, via another plate, which is characterized here as an interlock plate and which engages with a collar or other means on or in the swiveling lever in order to bring it into an extended or non-swiveled or non-excursion position and remove all undesired gears. Shifting elasticity may be achieved, for example, by a spring that impinges the positioning element—thus, in particular the (engagement) bolt or the (engagement) pin or the (engagement) peg—with an appropriate force. It may also be provided that any lateral loading of the thread that may occur in the (shift) plate or nut is prevented or reduced by a suitable device such as a guiding device, which supports the positioning device against a housing.

According to the invention, a motor vehicle transmission, in particular having an actuating apparatus according to the invention, is also proposed.

Furthermore, according to the invention a method for the automated control of gear change operations in a motor vehicle transmission via exactly one electric motor that has an output shaft is proposed having the following steps: driving the electric motor or the output shaft in a first rotational direction in order to select a gear to be engaged in the motor vehicle transmission; and driving the electric motor or the output shaft of the electric motor in a second rotational direction opposite the first in order to engage the gear or in the gear of the motor vehicle transmission that was selected by driving the electric motor or the output shaft in the first rotational direction.

BRIEF DESCRIPTION OF THE DRAWINGS

In the following several exemplary and preferred designs according to the invention are explained with reference to the Figures; however, the invention is not to be restricted in scope thereby. In the drawing:

FIGS. 4a and 4b are views in partial section of an exemplary positioning device of an actuating apparatus in two loading states of a spring, which may be present, for example, in the designs according to FIGS. 1 to 3 or 5a to 5c;

FIGS. 5a to 5c show an exemplary actuating apparatus according to the invention in three positions;

FIG. 7 shows steps of an exemplary method according to the present invention in diagrammatic illustration;

FIG. 8 is a functional diagram for an actuating apparatus for a dual clutch transmission;

FIG. 9b shows a second variation (without sensor) of the embodiment according to FIG. 9a;

FIGS. 10 and 11a are cutaway illustrations of the design according to FIG. 9a;

FIG. 12 is a side or section view of the design according to FIG. 9a;

FIG. 13a is an exploded view of the design according to FIG. 9a;

FIGS. 18a and 18b show the design according to FIG. 9a or 9b in different rotary positions of the eccentric;

DETAILED DESCRIPTION OF THE PREFERRED EMBODIMENT

Figure 1:
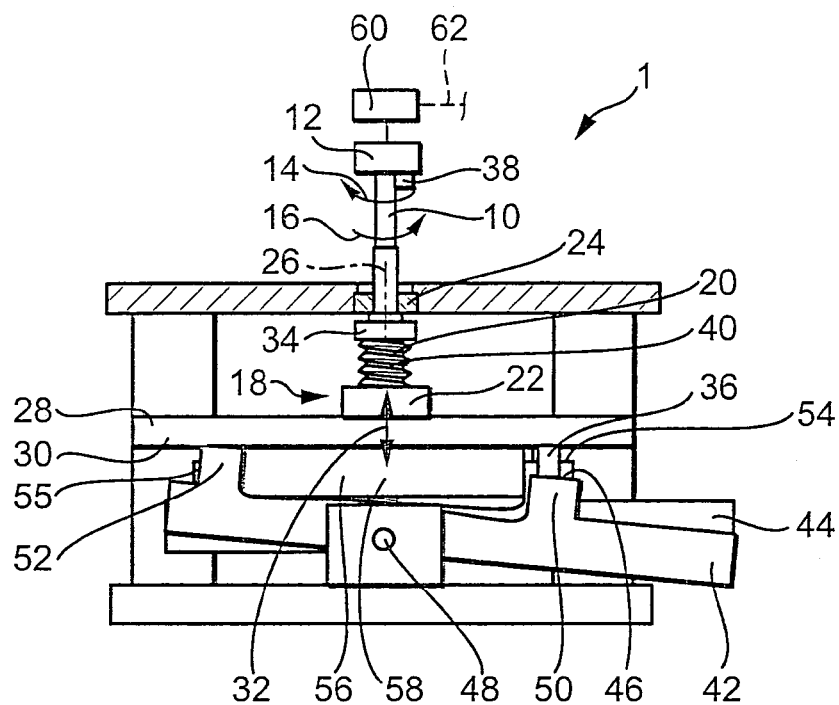
FIG. 1 is an exemplary design of an actuating apparatus according to the invention in diagrammatic sectional view.

FIG. 1 shows an exemplary actuating apparatus 1 according to the invention in diagrammatic illustration.

The actuating apparatus 1 shown in FIG. 1 may for example be an actuating apparatus by means of which gears may be changed in a motor vehicle transmission or by which the changing of gears may be controlled.

Actuating apparatus 1 has a rotatably mounted drive shaft 10 that in this case is motor output shaft 10 of a drive device designed as an electric motor 12. This drive or output shaft 10 may alternatively be turned via the electric motor 12 about its longitudinal axis in a first direction, which is diagrammatically indicated by arrow 14, or in a second rotational direction, which is diagrammatically indicated by arrow 16 and is opposite the first rotational direction. Electric motor 12 may accordingly be designed to be switchable so that the drive shaft can be driven—as desired—in both directions.

Actuating apparatus 1 has a nut/threaded spindle assembly 18. This nut/threaded spindle assembly has a threaded spindle 20, and a nut 22 whose thread engages threaded spindle 20. Nut 22 and threaded spindle 20 may be provided with a right-hand thread or with a left-hand thread. In the design according to FIG. 1, threaded spindle 20 faces or is situated closer to drive shaft 10 in the power flow, and threaded nut 22 faces away from or is situated farther away from drive shaft 10. The part of nut/threaded spindle assembly 18 that faces drive shaft 10, that is, in the design according to FIG. 1, threaded spindle 20 may be driven in a rotational manner by the drive shaft in the operation of actuating apparatus 1, and specifically a purely rotational manner. Appropriate bearing means 24 may be provided that can also be designed in such a manner that threaded spindle 20 or the part of nut/threaded spindle assembly 18 that faces drive shaft 10 is mounted in an axially fixed rotatable manner.

In the exemplary design according to FIG. 1, the part of nut/threaded spindle assembly 18 that faces drive shaft 10 in the power flow, thus in the form according to FIG. 1, threaded spindle 20 is rotationally fixedly coupled to drive shaft 10. In addition, this coupling may also be designed in an axially fixed manner.

In the design according to FIG. 1, longitudinal axes of the motor output shaft or drive shaft 10, as well as spindle 20 and nut 22, are essentially concentric. These longitudinal axes or the axial direction are/is indicated diagrammatically by broken line 26.

The part of nut/threaded spindle assembly 18 that faces away from drive shaft 10 in the power flow, thus in the form according to FIG. 1, nut 22 is fixedly coupled, in this case rotationally and axially fixedly coupled, to a positioning device 28.

Positioning device 28 in the design according to FIG. 1 has a control element in the form of a plate 30, which is also called a selector plate or shift plate or changeover plate or control element. As is indicated by double arrow 32, the axial position of plate 30 or of positioning device 28 may be changed in both orientations. This axial position or the assigned axial direction may be the axial or longitudinal direction of drive shaft 10 and/or threaded spindle 20 and/or nut 22 and/or the positioning device 28. In the design according to FIG. 1, the axial direction of positioning device 28 coincides with the axial direction 26 of nut 22.

In the design according to FIG. 1, the axial position of nut 22 and positioning device 28 may therefore be modified or displaced. In the one orientation of the axial direction or longitudinal direction 26, this axial displacement of nut 22 or of positioning device 28 is limited by a stop 34. If drive shaft 10 is driven or moved in first rotational direction 14, nut 22 or positioning device 28, as long as it is not yet resting against the stop—as shown in FIG. 1—migrates in the direction of stop 34 or runs up against this stop 34. If the stop or the stop position is reached or, in the design according to FIG. 1, nut 22 bumps against stop 34, this stop 34 causes the axial position of nut 22 or of positioning device 28 to be modified no further in relation to spindle 20 when drive shaft 10 continues to rotate in a first rotational direction 14, because the stop momentarily hinders or blocks this further axial movement in axial direction 26. However, if drive shaft 10 is driven further in first rotational direction 14, nut 22 and positioning device 28 are moved in an essentially purely rotational manner or swiveled or rotated about rotational axis 26. In relation to this rotational axis 26, the positioning device 28 is rotationally asymmetrically designed. In the design according to FIG. 1, this is such that a positioning element 36 disposed rotationally asymmetrically with respect to rotational axis 26 is provided. This positioning element 36 in the design according to FIG. 1 is a bolt or a projection or a pin that projects from the plate in the direction facing away from drive shaft 10 and is held against said plate. As is also explained in reference to FIGS. 4a and 4b, a spring may also be provided that loads bolt 36 and if required is supported against plate 30.

In the previously discussed stop position, in which the positioning device cannot migrate further along the spindle when the drive shaft rotates further in a first rotational direction 14 and this positioning device is rotationally entrained, the position of positioning element 36 in the rotational direction can be set by the drive shaft being rotated accordingly in first rotational direction 14. A displacement measurement device 38 may be provided that is disposed, for example, in the area of motor 12 or drive shaft 10 and is able to determine rotary position. It may also be provided that in the aforementioned stop position there is a rotational position at which the positioning device is also blocked in the other orientation of the axial direction or when drive shaft 10 is loaded in the direction of second rotational direction 16 cannot be moved in the direction directed away from the stop or cannot be moved downward. Due to the fact that at a rotational position a downward movement or mobility of positioning device 28 or plate 30 that is directed away from the top is hindered or blocked, displacement measurement device 38, which in particular has or is an incremental displacement sensor, can be calibrated. As a result, at least in the case that the displacement measurement device is formed as an incremental displacement sensor or has one, an additional sensor, especially an external one, that detects the rotational position of positioning device 28 or plate 30 can be avoided for the system, the rotational position of positioning device 28 or plate 30 being detectable nonetheless. This may be of significance, for example, if displacement measurement device 38 disposed on the motor or one or more sensors disposed there detect or count the revolutions or speed and thereby determine the rotational position of positioning device 28 or plate 30 and if in the process the sensor or sensors of displacement measurement device 38 lose the position or setting information because of, for example, an interruption in the power supply or some other reason. In such a case, for example, positioning device 28 or plate 30 or nut 22 can be run against the stop, which in the design according to FIG. 1 is an upper stop, in a manner controlled, for example, via a control device, and be moved into any position in the first rotational direction, a check being made of whether at this particular rotational position a movement of the positioning device 28 directed away from the stop or downward is possible until the rotational position is found at which positioning device 28 or plate 30 cannot be moved downward or in the direction away from stop 34. This can be done, for example, in such a manner that the drive shaft is moved into a quickly changing back and forth motion, the first movement in the direction of first rotational direction 14 or an appropriate rotational angle being somewhat larger than the return move in the direction of second rotational direction 16, so that the positioning device or plate 30 is moved essentially into any rotational position, and there a check is made of whether the positioning device can be moved away from the stop or downward in FIG. 1. If the position is found at which such a downward movement or such a movement directed away from the stop is possible, it may be provided that the sensor or incremental displacement sensor—especially in its zero position—is reset and begins to count anew.

Displacement measurement device 38 can be such that it has exactly one incremental displacement sensor that can detect both the position of positioning device 28 or plate 30 in the select direction and the position of positioning device 28 or plate 30 in the shift direction. In particular, displacement measurement device 38 is such that it can detect the rotational position of positioning device 28. Displacement measurement device 38 may also be such that it can in particular also additionally determine the axial position of positioning device 28.

In the design according to FIG. 1, stop 34 is rotationally and axially fixedly connected to spindle 20.

In the design according to FIG. 1, stop 34 is an enlargement of the spindle whose outer diameter is greater than the outer diameter of thread 40 of spindle 20 and thus has an axial stop area.

As mentioned, with an actuating apparatus 1 according to FIG. 1, the "select movement" for selecting a gear to be engaged in the transmission device may be carried out by a further turning or driving of drive shaft 10 in first rotational direction 14.

In the design according to FIG. 1, although it is not shown there, further explanation is given in reference to the following figures of a torsional lock, especially one acting in one direction, or a one-way clutch acting in one direction, which is in a stop position in at least two rotational positions of the positioning device, and in the process each prevents a rotation or further rotation of positioning device 28 about the axis of positioning device 28 if drive shaft 10 is driven into second rotational direction 16. In this context it may be provided in some cases that after the selection by rotation of drive shaft 10 in first rotational direction 14 followed by a rotation of drive shaft 10 in the opposite or second direction 16, the positioning device is first turned or screwed in by the drive shaft according to this load until a stop position of the torsional lock or one-way clutch is reached.

These stop positions of the one-way clutch are in particular such that, upon further turning of the drive shaft in second direction 16, a rotational movement of nut 22 or positioning device 28 is hindered by this one-way clutch so that positioning device 28 is moved in an essentially purely translatory manner without being turned in the direction of switching elements 42, 44.

The one-way clutch or the torsional lock is such that after it has been brought back into the stop position it hinders a turning of the positioning device or holds its rotational position fixed during the shift movement in the direction of the "engaged gear" over the entire axial displacement range of the positioning device.

In this design it is ensured that positioning element 36 or a corresponding engagement area of positioning device 28 is moved in such a manner that upon continued rotation of drive shaft 10 there is a shift in the second direction of the selected gear in the transmission device, or positioning element 42 or engagement area 46, which is assigned to this gear or to the engagement of the gear, is accordingly loaded and the shift of the gear or corresponding synchronization is effected.

In the design according to FIG. 1, positioning elements 42, 44 are each swiveling levers that are each pivoted about a swivel axis 48. Engagement areas 50, 52, 54, 55 of swiveling lever 42 are each formed of projections in the design according to FIG. 1 that project from these swiveling levers 42 essentially in the direction of positioning device 28. As shown in FIG. 1, it is provided there that positioning element 36 loads engagement area 50 of swiveling lever 42 and there presses it downward. Moreover, it may be inferred from this figure that swiveling lever 42 is thereby moved downward in an excursion on the one side of the rotary axis, namely to the right of the rotary axis in FIG. 1. Corresponding to this downward excursion position is the engagement of a predetermined gear in the transmission that is assigned to this swiveling lever and this swivel position.

Swiveling lever 44 is shown in FIG. 1 in a neutral position. This neutral position is such that neither the partial swiveling lever disposed on the one side of the swivel axis nor the partial swiveling lever disposed on the other side of the swivel axis produces an excursion in such a manner that a gear assigned to these swiveling lever areas is engaged in the transmission device.

Latches or the like may be provided that stop an engaged gear in this engaged position as long as this gear is not actively or intentionally disengaged again.

Actuating apparatus 1 has an interlock device or an additional positioning device 56. This additional positioning device 56 is such that it removes predetermined shifted gears before a selected gear is shifted or synchronized in this connection in the transmission or it guarantees that the predetermined gears are not shifted. Additional positioning device 56 may have or be, for example, a plate 80; this plate may, for example, be flat or not flat. Additional positioning device 56 may, alternatively or additionally, have a collar 58. Such a collar may, for example, also be a projecting cylinder or a partially cylindrical part, it being provided in particular that the central longitudinal axis is disposed essentially concentric with or parallel to longitudinal axis 26 of positioning device 28. It may be provided that additional positioning device 56 is fixedly attached to positioning device 28 and specifically rotationally and axially fixedly attached. This may be the case, so that a projecting collar 58 or a projecting wall is integrally formed on a plate 30 of positioning device 28.

Additional positioning device 56 extends in particular to the side of positioning device 28 that faces swiveling lever assembly 42, 44. Additional positioning device 56, as already indicated, can move predetermined shift elements or swiveling levers into a neutral position or guarantee that they are in a neutral position.

In the position shown in FIG. 1, it is the case, for example, that swiveling lever 44 is in a neutral position there that is an essentially horizontally aligned position of swiveling lever 44. Additional positioning device 56 or its collar engages between two projections 54, 55 of swiveling lever 44 in the illustration of FIG. 1. This may in particular be such that swiveling lever 44 is thereby secured against swiveling.

Actuating apparatus 1 has exactly one electric motor 12. This electric motor can control or effect all movements and/or actuation movements of actuating apparatus 1.

If, for example, when starting from the position shown in FIG. 1 at which bolt or pin 36 engages in swiveling lever 42 So that the swiveling lever side situated on the one side of swivel axis 48 is pressed downward and an appropriate gear is engaged in the transmission device, drive shaft 10 is moved in the first rotational direction indicated by arrow 14, spindle nut 22 migrates along spindle 20 in the direction of stop 34, thus, upward in the design according to FIG. 1. Positioning device 28, which is fixedly coupled with this spindle nut 22 and add-on position device 56, which is also fixedly coupled with spindle nut 22 follows this movement. In this context, swiveling lever 42 or a component coupled thereto is held by a latch or similar device in such a manner that the gear remains engaged. Collar 58 migrates out of its engagement position between projections 54, 55. If, upon continued movement of drive shaft 10 in the direction of first rotational direction 14, nut 22 reaches stop 34 and abuts against it, a further axial displacement of nut 22 or positioning device 28 in relation to spindle 20 is hindered or blocked. Spindle 20, which is still turning and is driven by drive shaft 10, which is moved in first rotational direction 14, is loaded and moved further in the rotational direction. Nut 22 is likewise loaded by the thread pair disposed between spindle 20 and nut 22.

Since nut 22 cannot be displaced further in the axial direction precisely because it abuts stop 34, the nut is moved in a rotational manner together with the spindle and, to be precise, in a purely rotational manner. Positioning device 28 and additional positioning device 56 or collar 58 follow this movement. The rotation may continue in this way until running against a rotational position of positioning device 28 that is such that, upon subsequent rotation of shaft 10 in opposite direction 16 or second direction 16, the positioning device 28 is moved back away from the stop or in the direction of positioning elements 42, 44 in such a manner that this positioning device is moved up to such an engagement area of the shift element or swiveling lever 42, 44 that is to be moved in order to synchronize the transmission and/or to shift into the new gear.

In a manner already outlined above and also explained with examples in relation to other figures, a torsional lock or a one-way clutch may be provided in this context that causes the positioning device, at least as soon as a stop position is reached, to be moved in an essentially purely translatory manner, thus, without rotating, to move in the second rotational direction 16 in the direction of the shift element as output shaft 10 continues to turn. However, before positioning element 36 engages in an appropriate engagement area of the selected gear or the corresponding shift element, additional positioning device 56 or its collar 58 causes the undesired or predetermined gears to be disengaged or ensures that such are disengaged. In an automated shift transmission, this may be all gears, it being possible to forego a corresponding engagement of the additional positioning device in the swiveling lever, which is to be actuated via the positioning element to shift the new gear.

However, it may also be provided, for example, in a parallel shift transmission (PST), that by means of additional positioning device 56 only a portion of the gears is disengaged or it is ensured that a portion of the gears is disengaged. This may be, in the case of a parallel shift transmission, for example, such that it must be ensured that all even gears are disengaged or will be if the gear that is selected or to be engaged is an even gear and all odd gears are or will be disengaged if the gear that is selected or to be engaged is odd.

If, for example, starting from that position shown in FIG. 1, a new gear is to be engaged after the selection and in this context is to be engaged in swiveling lever 44 in an actuated manner for the synchronization and engagement of the new gear, swiveling lever 42 may first be moved into a neutral position. To do this, collar 58 can first load projection 52, which juts out further, of swiveling lever 42 and press it down. By pressing it down, the end section of the projection that faces the swiveling axis would then increasingly be moved outward so that a position is reached at which collar 58 may engage between projections 50, 52. Upon further rotation of drive shaft 10 in the direction of second rotational direction 16, additional positioning device 56 or collar 58 would then migrate further axially between projections 50, 52, positioning element 36 essentially simultaneously migrating further in the direction of the engagement area in which it is to engage in order to shift the selected gear. If this engagement then occurs, the corresponding swiveling lever, in this case swiveling lever 44, for example, moves into an upward or downward excursion in the region of the engagement area so that an appropriate gear is shifted in the transmission device.

Actuating apparatus 1 has an electronic control device 60, such as an electronic transmission controlled device. This electronic control device 60 is linked by signal to electric motor 12 and can control it. In particular, this electronic control device 60 can drive electric motor 12 and with it drive shaft 10 either in the first rotational direction 14 or the second rotational direction 16 or decide between these rotational directions 14, 16.

Electronic control device 60, as is schematically indicated by broken line 62, can receive signals and transmit them as needed. Such signals may also be used for controlling purposes. For example, performance characteristic values of a motor vehicle or signals from a selection lever or the like may be indicated to the electronic control device in this manner.

Positioning device 28 of the actuating apparatus 1 shown in FIG. 1 may be loaded and moved by the drive device or electric motor 12, and specifically in a rotational manner and in a translatory manner or in axial direction 26. Both the rotational as well as the translatory or axial movement of the positioning device may be produced via output shaft 10 or a movement of output shaft 10. There exists in this design a position, namely that at which nut 22 abuts against the stop 34, in which the rotary or swivel position of positioning device 28 is modifiable essentially independently of an axial or translatory movement situated in this direction. A plurality of gear steps, to which different ratios are assigned, of a transmission device may be shifted or changed using actuating apparatus 1. The positioning movements for this, including in particular the swiveling of swiveling levers 42, 44 in the design shown in FIG. 1, may be produced using this actuating apparatus 1 and in particular using exactly one electric motor 12. In the design according to FIG. 1, it is possible to shift from one gear into three other gear steps directly, that is, without another gear being engaged in between. This may, for example, be such that, in a manner already outlined above, positioning device 28, starting from the position shown in FIG. 1 is moved by a rotation of drive shaft 10 in the first rotational direction up to the stop position and then is turned in first rotational direction 14 via a further turning of drive shaft 10 in first direction 14. This turning may be such that when drive shaft 10 is subsequently turned in second direction 16 positioning device 28 is turned in such a manner that positioning device 28 or positioning element 36 is moved until it loads projection 52 and thereby causes the engagement of the appropriate gear in the motor vehicle transmission. By appropriate or appropriately different rotation of positioning device 28 in the stop position, starting from the position at which the positioning element loads engagement area 50, the positioning device likewise or alternatively may be turned or displaced in such a manner that after the selection and after the corresponding displacement of drive shaft 10 in the second direction, it loads projection 55 or, likewise alternatively, projection 54. It is therefore possible, starting from one engaged gear, to shift into one of three other gears without an intermediate gear ratio having to be engaged.

This permits one to follow the theory of the invention to realize even more gears than are illustrated here.

With the previous, exemplary explanation it was also shown that swiveling levers 42, 44 may be loaded or actuated—as desired—via the positioning device in both swiveling directions.

Using, for example, a motor vehicle transmission actuating apparatus for gear change operations or to change from a starting gear to a target gear, it is possible to actuate or control the select function or the movement in the selector gate direction as well as the shift function or the movement in the shift channel direction or the shifting or engagement of gears and disengagement of gears, thereby enabling only one electric motor 12 to be used for these functionalities. However, an electric motor 12 does not have to be provided. A different drive device may also be provided.

Figure 2:
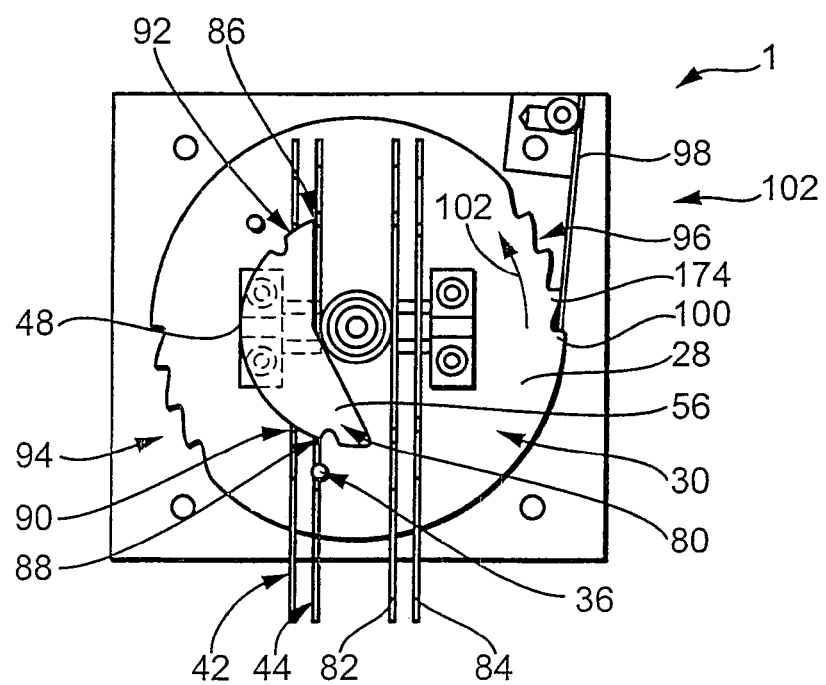
FIG. 2 is an exemplary design of an actuating apparatus according to the invention in diagrammatic sectional view that in particular may be combined with the design of FIG. 1.

FIG. 2 shows an exemplary design of an actuating apparatus according to the invention in schematic sectional view.

Shown in particular in FIG. 2 is a top view of a positioning device 28 and an additional positioning device 56.

The design corresponding to the one shown in FIG. 2 may also be present in the design shown in FIG. 1. However, while additional positioning device 56 was described above in reference to FIG. 1 as a type of collar, this add-on device in the design according to FIG. 2 is designed as a plate or interlock plate 80. With such a plate, it may also be provided that gears are disengaged via a collar that was not described above. Furthermore, additional positioning device 56 in the design according to FIG. 2 is designed as an additional positioning device 56 that may be used, for example, for a parallel shift transmission. This also may but does not have to be the case in the design according to FIG. 1.

Four swiveling levers 42, 44, 82, 84 are shown in the design according to FIG. 2. These swiveling levers 42, 44, 82, 84 can each be moved in one swivel direction from the other—or alternatively—from the neutral position in an excursion to shift a gear, so that eight gears can be shifted. It may also be provided that by using one or more swiveling levers two gears cannot be shifted, rather only one gear.

In the design according to FIG. 1, interlock plate 80 is designed as a sector plate. This plate 80 in this design is such that this additional positioning device 56 does not act on swiveling levers 82, 84. It may be provided, for example, that swiveling levers 42, 44 are assigned even gears and swiveling levers 82, 84 are assigned odd ones, or vice-versa.

A positioning element is shown in FIG. 2. From the position of this positioning element 36, it is evident that a selection was carried out in such a way that this positioning element 36 may actuate or load swiveling lever 44 to shift a gear, and in particular the part of this swiveling lever 44 disposed below swiveling axis 48. Because the part of swiveling lever 44 that is disposed on the other side of swiveling axis 48 is moved in this context in the direction of positioning device 28 or additional positioning device 56, interlock plate 80 or additional positioning device 56 is laterally disposed in such a manner that there is play or a gap between the part of swiveling lever 44 that is moved via positioning elements 36 in the direction of the additional positioning device when there is a load and the section of plate 80 that is adjacent to this area. However, plate 80 engages between the interlock points or projection or projection edges 88, 90, and 92 that are provided on the swiveling lever 42 or 44 so that swiveling in the direction of positioning device 28 is hindered for these sections. The plate or selector plate 30 of positioning device 28 is provided on its outer perimeter with profiles 94, 96 that have profile elevations and profile recesses. A latching element is designed here with an essentially plate-like shape and extends preferably over the entire axial displacement range of the positioning device, which is situated perpendicular to the plane of the diagram. As depicted in FIG. 2, latching element 98 engages in profile elevation 100. Regarding the design of profile elevation 100 and of the engagement of the latching element, it may be recognized that in this stop position, positioning device 29 is prevented from turning in the direction of arrow 102*a* or is appropriately secured. Positioning device 28 may be turned in the counter direction, at least after over-coming a certain friction or holding force.

The direction of arrow 102*a* essentially corresponds to the direction in which positioning device 28 is loaded if drive shaft 10 is moved in a second direction.

A profile elevation is provided for each gear that can be shifted. As may be inferred from FIG. 2, eight profile elevations are to be provided therein which latching element 98 can engage, along with eight shiftable gears.

This torsional lock, or this one-way clutch 102, having latching element 98 may be used to cause positioning element 36 to move to the appropriate engagement area for shifting a gear after the selection, in particular without being moved in a rotational manner, and specifically moved in a purely axial manner.

Figure 3:
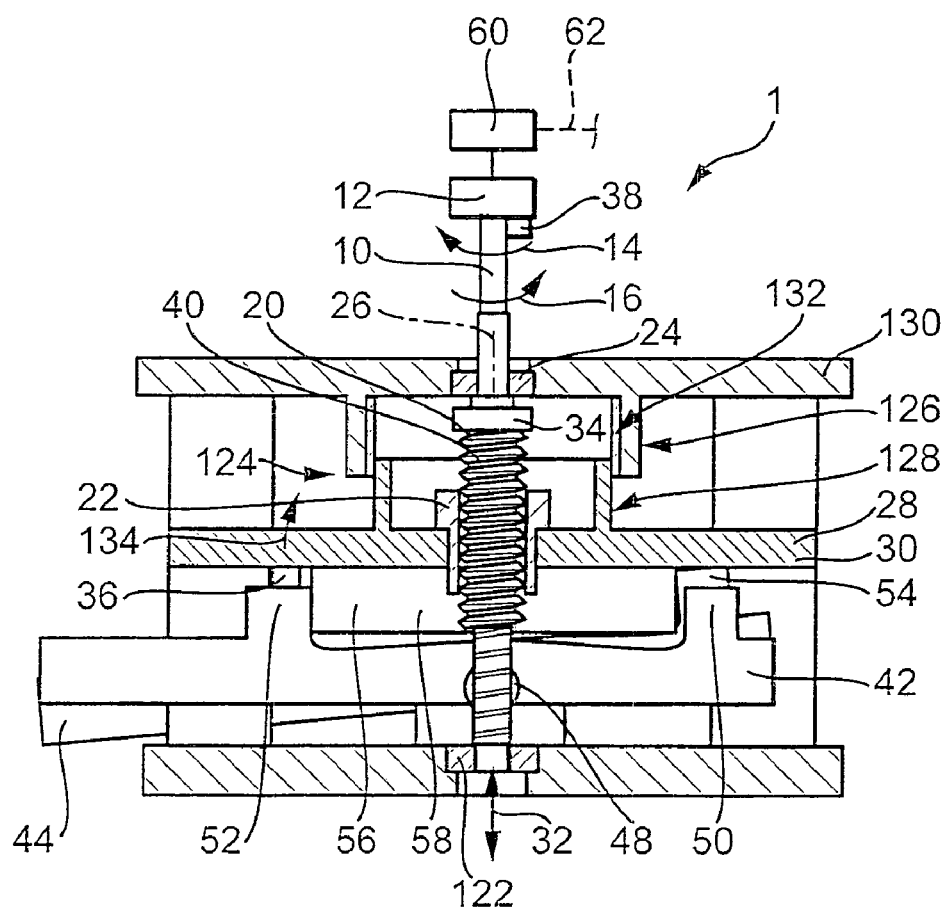
FIG. 3 is an exemplary design of an actuating apparatus according to the invention in diagrammatic sectional view that in particular may be combined with the design of FIG. 1 and/or FIG. 2.

FIG. 3 shows an exemplary design of an actuating apparatus 1 according to the invention.

In the design according to FIG. 3, in addition to thread 40 of the spindle, thread 120 of nut 22 is also shown, spindle 20 engaging in thread 40. In the design according to FIG. 3, positioning element 36 of positioning device 28 engages in swiveling lever 44 So that it moves in a downward excursion on the left in the design according to FIG. 3, and an appropriate gear is engaged.

In FIG. 3 another bearing 122 of spindle 20 is also shown.

In the design according to FIG. 3, a guiding device 124 or a device that wards off or reduces a lateral loading of threads 40, 120 is shown.

Guiding device 124 has a first shoulder and a second shoulder. Second shoulder 128 is firmly connected to positioning device 28 and extends from this positioning device 28 or a plate 30 of this positioning device 28 in the direction facing away from shift elements 42, 44. Shoulder 128 may be, for example, a cylindrical wall section.

Shoulder 126 is provided on a housing 130 and in particular in such a way that this shoulder 126 extends from an inner surface of a housing wall into the housing interior. Shoulder 126 is likewise an essentially cylindrical wall section. Furthermore, a bushing, such as a plain bearing bush 132 is provided that is radially disposed between shoulders 126, 128. It may be provided that shoulders 126, 128 as well as bushing 132 are concentrically disposed. It may also be provided that the (hollow) cylindrical elements or shoulders 126, 128—and possibly bushing 132—are concentrically disposed in relation to spindle 20 or nut 22. The shoulders engage within each other in such a manner that positioning device 28 can be supported against housing 13 0—possibly via the bushings—and in particular perpendicular to the axial direction of the shoulders or in the radial direction of the shoulders, it being also possible to pick up moments, and in particular such as act about an axis that is perpendicular to the axis of the shoulders.

This guiding device 124 facilitates a guiding function, this being such that the guiding guarantees an axial mobility and a rotational mobility. If a moment, which could represent a loading of thread 40, 120, acts, for example, according to arrow 134 by engagement of positioning element 36, for example, when shifting a gear in the transmission device, this moment or this load is at least partially warded off by guiding device 124.

Exemplary explanation is now given in reference to FIGS. 4*a* and 4*b* as to how a shift elasticity may be provided in an actuating apparatus according to the invention.

Positioning device 28 is shown in both FIG. 4*a* and 4*b* in a partial section view, the positioning device according to FIGS. 4*a* and 4*b* having a select plate or a shift plate or plate 30, as well as a positioning element 36. Positioning element 36 is formed as a type of bolt and has a first part 150 and a second part 152. First part 150 is inserted through an opening 154 in plate 30 and is fixed there, for example, by a screw or appropriate attachment means. Part 150 extends into part 152, which is designed like a cage. Part 150 is caught inside part 152 so that it is blocked in both axial directions, but is disposed between them so as to be axially displaceable in relation to part 152.

A spring device 156 is provided that is designed as a flat coil spring. This spring is supported against plate 30 on one side and against part 152 of positioning element 36 on the other. If, within the context of engaging a gear, positioning element 36 then loads a shift element, such as swiveling lever 42, 44, and an engagement of a gear is thereby effected, synchronization first takes place. In this synchronization, spring 156 is compressed or loaded, which is shown in FIG. 4a. If the gear is then engaged, spring element 156 is decompressed again, which is shown in FIG. 4b.

Figure 5C:
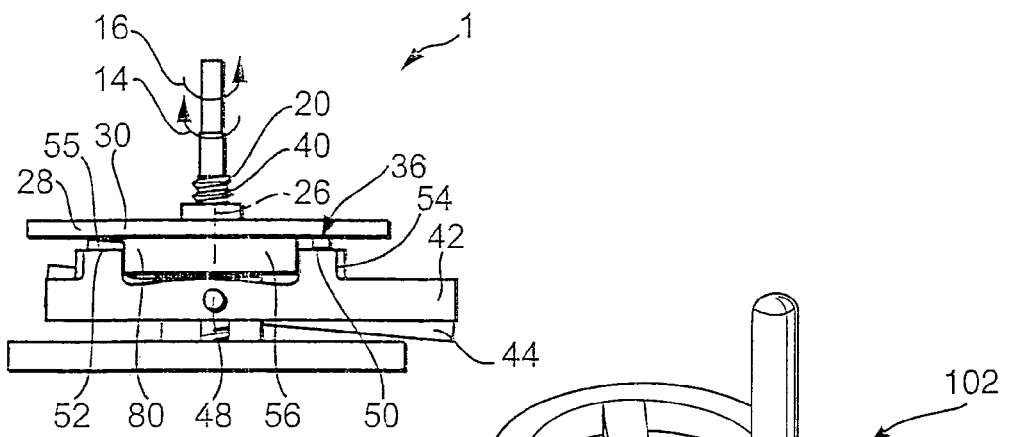

An exemplary gear-shifting or changeover process is now explained in reference to FIGS. 5a, 5b and 5c.

Actuation device 1 may in particular be such as is explained in reference to the remaining figures.

In the design according to FIG. 5a, swiveling levers 42, 44 are engaged in one gear or two gears are engaged. One can recognize from this that swiveling levers 42, 44 are moved in an excursion from the neutral position—horizontal in FIGS. 5a to 5c—of the swiveling levers. Swiveling lever 44 is moved in an upward excursion and swiveling lever 42 is moved in a downward excursion, it being possible to shift a gear in each of FIGS. 5a to 5c, in the right section of each swiveling lever, by movement in an upward or downward excursion. This design may be present in particular in a parallel shift transmission. However, in an automated shift transmission, for example, it can be modified accordingly, whereby only one gear is shifted there, which can be achieved, for example, via an appropriate design of additional positioning device 56.

From FIG. 5a—in conjunction with FIGS. 5b and 5c—it may be inferred that positioning device 28 has run up to a selection position for engagement of a new gear. This is in particular such that—as also explained in another place— drive shift 10, in some cases via an electric motor 12, is turned in a first rotational direction 14 until nut 22 or positioning device 28 is moved against a stop 34 and then, upon further turning of drive shift 10 in first rotational direction 14 is moved in a purely rotational manner until positioning device 28 is in the new desired rotational position or corresponding select position for engaging the new gear.

In the design according to FIG. 5b, it is shown that additional positioning device 56 or the active interlock device has been moved along the spindle in the direction of swiveling levers 42, 44 and has swung these swiveling levers into a neutral position. The active interlock device or add-on device 56 engages here between projections 50, 52 or 54, 55 of swiveling lever 42 or 44. Beforehand, the additional positioning device or plate 80 headfirst swung projection 52 and projection 54 and, thus, the associated swiveling lever, into the horizontal position.

In the design according to FIG. 5b, it can also be recognized that the positioning element or bolt 36 is still axially at a distance from the corresponding engagement area in which it is to engage in order to shift a gear.

From the design shown in FIG. 5a to the design shown in FIG. 5b, positioning device 28 or additional positioning device 56 has been moved by virtue of drive shaft 10 having been turned in second rotational direction 16. In the process, a one-way clutch 102 (not shown in FIGS. 5a to 5c) essentially holds the rotational position of the swiveling device, and in particular against the force transmitted from the drive shaft moved in a second rotational direction to positioning device 28.

It is shown in FIG. 5c that plate 80 or the interlock plate has been moved all the way down and positioning element 36 presses swiveling lever 44 into the correspondingly assigned gear. In the process, swiveling lever 44, on its side that is disposed to the left of rotational axis 44 of actuating apparatus 1, is swiveled downward.

Figure 6A:
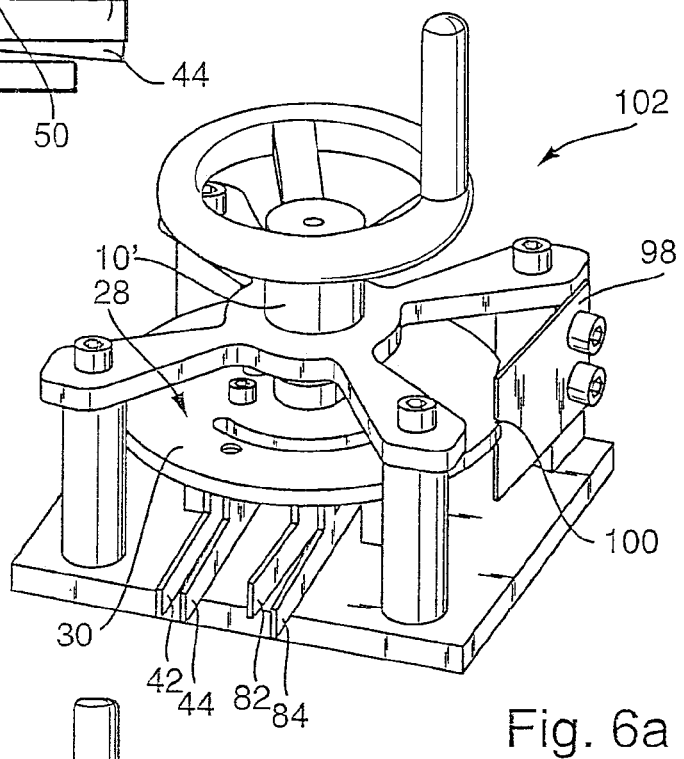
FIGS. 6a and 6b show two three-dimensional views of a model.
Figure 6B:
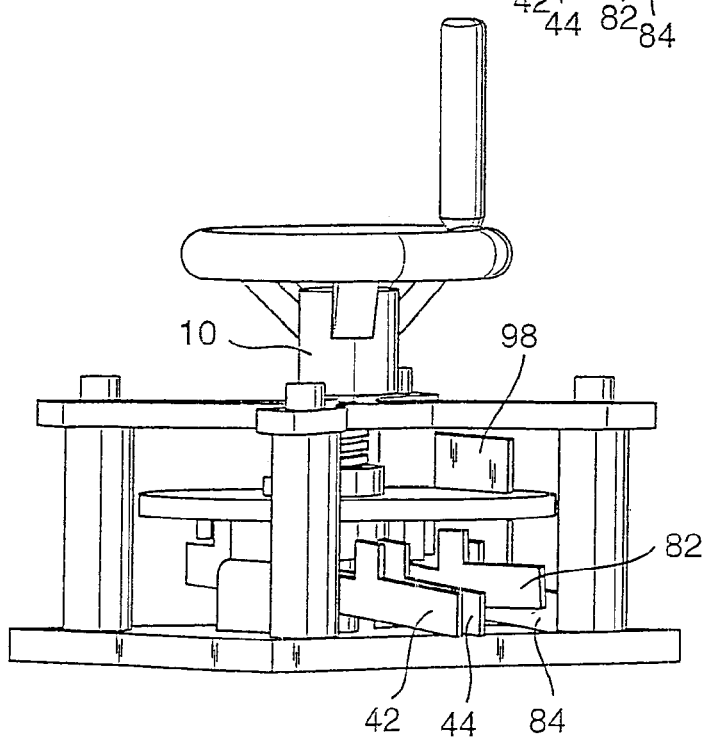

FIGS. 6a and 6b show two diagrammatic views of a model of an actuation device that is not driven by motor. In reference to FIGS. 6a and 6b, an exemplary explanation is to be made of how, for example, a latching element 98 or an element 98 of a one-way mechanism 102 or of the one-way clutch 102 or torsional lock acting in one direction can be designed. It may be inferred from FIGS. 6a and 6b that this latching element extends in the axial direction of positioning device 28 and that it can engage at different or changing axial positions of positioning device 28 or plate 30 of positioning device 28 in the projections of the positioning device—in this case in projection 100—and thus can hold positioning device 28 in a particular stop position.

Furthermore, an exemplary disposition of the positioning elements or swiveling levers 42, 44, 82, 84 can be inferred from FIGS. 6a and 6b. They are arranged essentially parallel to each other and so that they can load a corresponding element, such as a selector rail or actuation rod, in one direction, namely the one shown in FIG. 6a in the front.

FIG. 7 diagrammatically shows the steps of an exemplary operation according to the invention for the automatic control of gear changing operations in a motor vehicle transmission via exactly one electric motor 12 that has an output shaft or drive shaft 10.

In step 170 the electric motor or the output shaft of the electric motor is driven in a first rotational direction in order to engage a gear in the motor vehicle transmission.

In step 172, the electric motor or the output shaft of the electric motor is driven in a second rotational direction opposite the first in order to shift into the selected gear of the motor vehicle transmission or to engage it. Within the context of this step, there can be a synchronization of the transmission device.

Within step 172 it may also be provided that all gears or specifically shifted gears of the transmission device are removed or it is guaranteed that predetermined gears are not engaged. This can be carried out in particular before shifting the new gear.

The design features and mode of operation that were explained in reference to FIGS. 1 to 6c may also be provided in other of these figures—in some cases as alternatives—for other features so that also combinations of design features that were explained in reference to different figures represent preferred or exemplary embodiments of the invention.

FIG. 8 diagrammatically shows an actuating apparatus 200, especially for a dual clutch transmission having two separately formed transmission branches, each transmission branch having a plurality of separately shiftable gearshift pairs that are each shiftable via shift elements 242a, 242b. Actuating apparatus 200 in this exemplary embodiment is divided along separating line 200c into two subassembly groups 200a, 200b that are separately designed for each transmission branch. Each of subgroups 200a, 200b is capable of functioning on its own and has at its disposal an electric motor 212a, 212b that drives the particular drive shaft 210a, 210b and which—as previously described in the figures—includes a positioning device 236a, 236b. As described, for example, in FIGS. 1 to 7, shift elements 242a, 242b are operated in an analogous way, by corresponding positioning device 236a and 236b. In addition, there is a master cylinder 250a, 250b for each transmission branch that is likewise impinged by each particular positioning device 236a, 236b. In a known way, when a master cylinder of this type is impinged via a pressure line 251a, 251b, which is only intimated in the drawing, a corresponding slave cylinder is impinged that operates the clutch as a ring cylinder around the transmission input shaft or as a slave cylinder that is distanced from the transmission input shaft via the appropriate disengagement mechanics. The two slave cylinders of the dual clutch for the dual clutch transmission may be disposed radially nested one on top of the other around the transmission input shafts, which in this case are formed as a shaft/hollow shaft assembly, or the clutch distances them via corresponding disengagement mechanics. It may also be advantageous to provide a plurality of piston/cylinder units distributed around the perimeter, which—in an advantageous way—alternately impinges one clutch each on the same diameter around the perimeter, the radii of the impingement means, such as throwout bearings and/or parts that accommodate them on the piston, being adaptable to the opening circuit of the disk springs or throwout levers of each particular clutch. It also goes without saying that these techniques may be combined with each other in any desired way. For example, in the radial interior a ring cylinder may be provided for the first clutch and at the radial exterior a plurality of pistons distributed around the perimeter may be provided. Moreover, instead of a master cylinder, a suitable mechanical disengagement mechanism may be directly driven by the positioning device or a suitable signal sensor for detecting the disengagement displacement, the clutch displacement being actuated by outside means according to the distance covered by the displacement sensor. The displacement sensor in this context can be a hydraulic valve and electrical displacement sensor, such as an inductive displacement sensor, piezoelectric element or the like. The outside means may be pneumatic or hydrostatic impingement means moved by a correspondingly compressed pressure means, such as pistons, or electric actuators correspondingly controlled by the displacement sensor.

When there is an axial displacement of the corresponding positioning device 236a, 236b, the axial design of engagement areas 254a, 254b of master cylinder 250a, 250b and engagement areas 255a, 255b of positioning device 236a, 236b effects an engagement of positioning device 236a, 236b on master cylinder 250a, 250b before the corresponding shift elements 242a, 242b are operatively engaged with engagement areas 246 of shift elements 242a, 242b. In this manner master cylinder 250a, 250b operates the corresponding clutch before a gear is shifted. Of course, with an active interlock mechanism the appropriate gears are disengaged after operation of the clutch begins, and the gears to be newly engaged are engaged.

A special design of an actuating apparatus 200 for a dual clutch transmission can be made in such a manner that a single motor drives both transmission input shafts 210a, 210b, each of the drive shafts being driven in the opposite direction. In this way, during the change one clutch can be disengaged and the other engaged and corresponding gears changed. Therefore, for this exemplary embodiment, only one electric motor is necessary to shift and select gears in a dual clutch transmission and to operate both clutches.

Two additional exemplary embodiments of the invention are now explained in detail in reference to FIGS. 9a to 21. These two embodiments essentially differ in that there is a reference sensor device for one of these embodiments, while it is lacking in the other of these two embodiments. Because the two embodiments are otherwise essentially identical, they are explained together below in reference to the figures and in particular also with respect to detail features or preferred detail features.

In order to be able to distinguish between them, the embodiment with a reference sensor is designated as "sensor variation" and corresponding to the other embodiment as the "variation without a sensor".

Figure 9A:
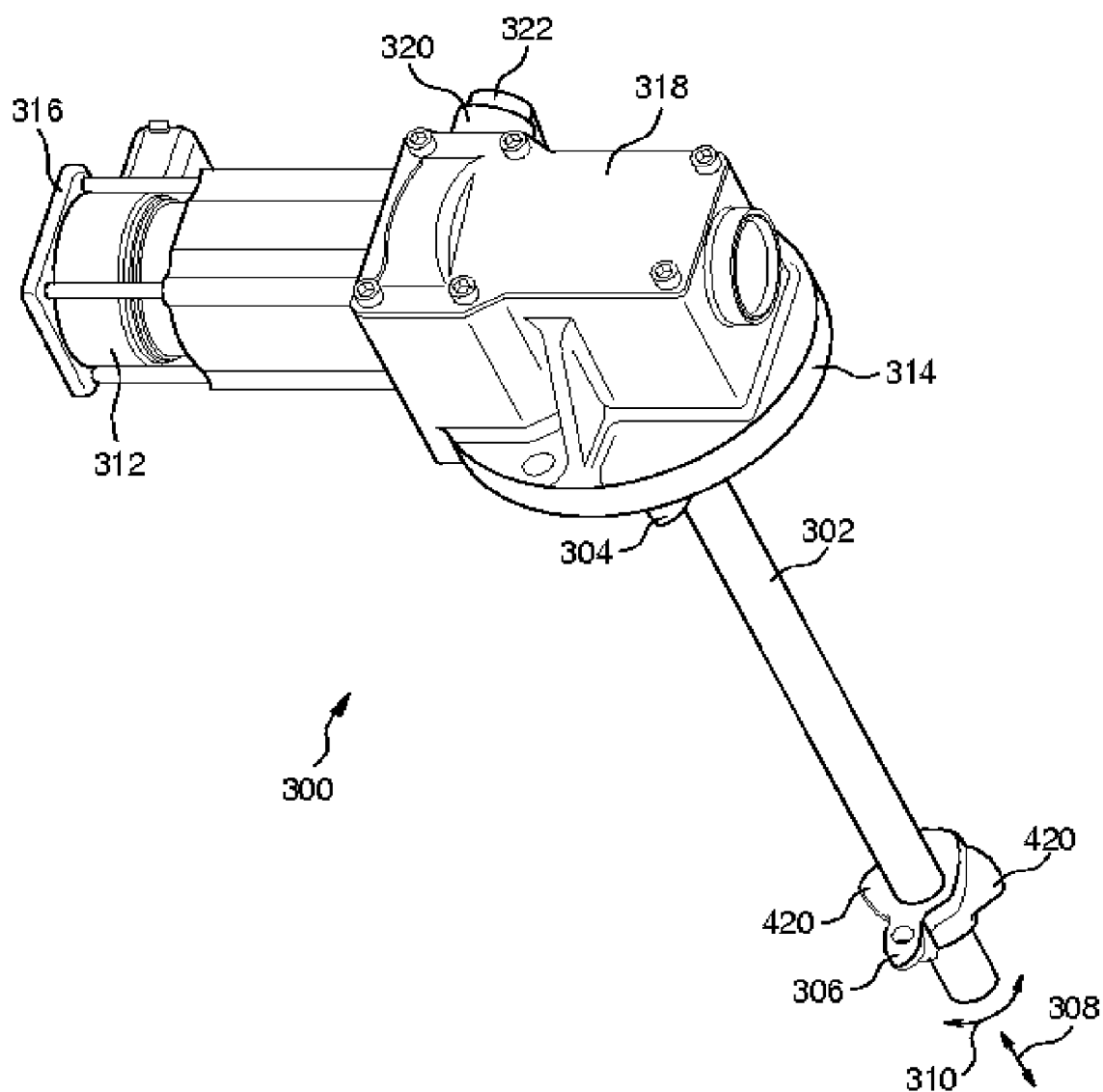
FIG. 9a shows a first variation (with sensor) of another exemplary embodiment according to the invention.
Figure 9B:
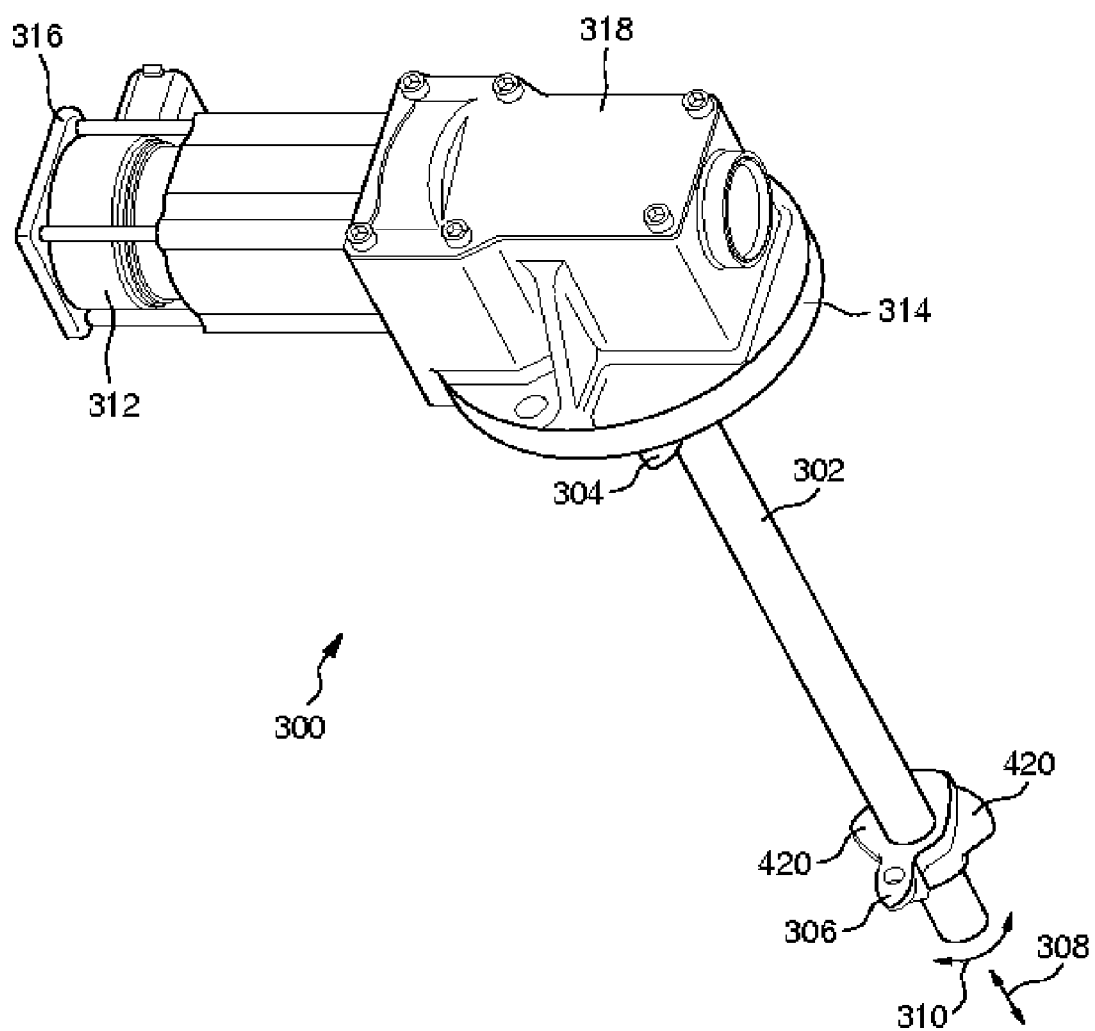

FIGS. 9a and 9b show a three-dimensional outer view of the exemplary design according to the invention. In this context, the variation with a sensor is shown in FIG. 9a and the variation without a sensor is shown in FIG. 9b. Actuating apparatus 300 has a shifter shaft 302 with rotational or swiveling mobility, on which two shift fingers 304, 306 are mounted. However, instead of two shift fingers 304, 306 it is also possible to alternatively provide that only one shift finger—or even more than two shift fingers—is mounted on this shifter shaft. Shifter shaft 302 and shift fingers 304, 306 may be a component of a positioning device or form a positioning device.

The design having two shift fingers is especially well suited for the actuation of transmissions in which there are two partial transmissions that are disposed in parallel drive train branches if—with an appropriate design of the transmission—axial travel distances of the shifter shaft (see double arrow 308) are to be kept low.

It may also be provided with transmissions of this type, such as the uninterrupted shift transmission (UST), parallel shift transmission (PST) or dual clutch transmission (DCT) that only one shift finger is provided. However, actuating apparatus 300 may also be used in designs in which the transmission forms only one transmission branch, such as an automated shift transmission (AST). Especially in such a design having only one drive train branch, it is provided that only one shift finger of actuation device 300 is provided. The axial direction in which there is a mobility of shifter shaft 302 is diagrammatically indicated by double arrow 308, and the rotational or swiveling direction in which there is a swiveling mobility of shifter shaft 302 is diagrammatically indicated by double arrow 310. Shift fingers 304, 306 are used in particular for actuation of shift elements or selector rails of the transmission. For this purpose, it may be provided that such selector rails or shift elements each have a shift mouthpiece, shift fingers 304, 306 being able to engage in these shift mouthpieces by actuation. In this context, the selector rails may be disposed in such a manner that the shift mouthpieces in the neutral position of the selector rails, in which no gear is engaged in the transmission, are aligned, the selector rails being aligned parallel to each other and adjacent to each other. For the select movement, the shifter shaft can then be axially displaced (arrow 308) and for the shift this selector shaft 302 can then be swiveled so that a corresponding shift finger 306 can come into engagement with a shift mouthpiece and a corresponding selector rail for engagement of a gear in the transmission, such as a motor vehicle transmission, can be moved accordingly. In this context the selector rails can be disposed, for example, in an axially displaceable manner.

To produce this axial movement (arrow 308) and swiveling movement (arrow 310), of shifter shaft 302, exactly one drive device is provided, which is formed here as electric motor 312. Electric motor 312 has an output shaft 334 that can be driven in a rotational manner in both directions or both orientations of its rotational direction. The design of actuating apparatus 300 enables this output movement of the electric motor—in particular as desired—to be converted into an axial movement (see arrow 308) of shifter shaft 302 or into a swiveling movement of shifter shaft 302, and in particular in both orientations.

Actuating apparatus 300 has a housing 314. Moreover, a holding device 316 for holding electric motor 312 or for other purposes is provided in the exemplary embodiment.

Housing 314 has a cover 318 that is removable, in this case by screws attached to housing 314.

In contrast to the design according to FIG. 9b, housing 314 in the design according to FIG. 9a has a holding area 320 to hold a Hall sensor 322. Hall sensor 322 is inserted in this holding area 320 or an opening of this holding area 320.

Hall sensor 322, in the variation with a sensor, is in particular a component of this sensor.

Figure 10:
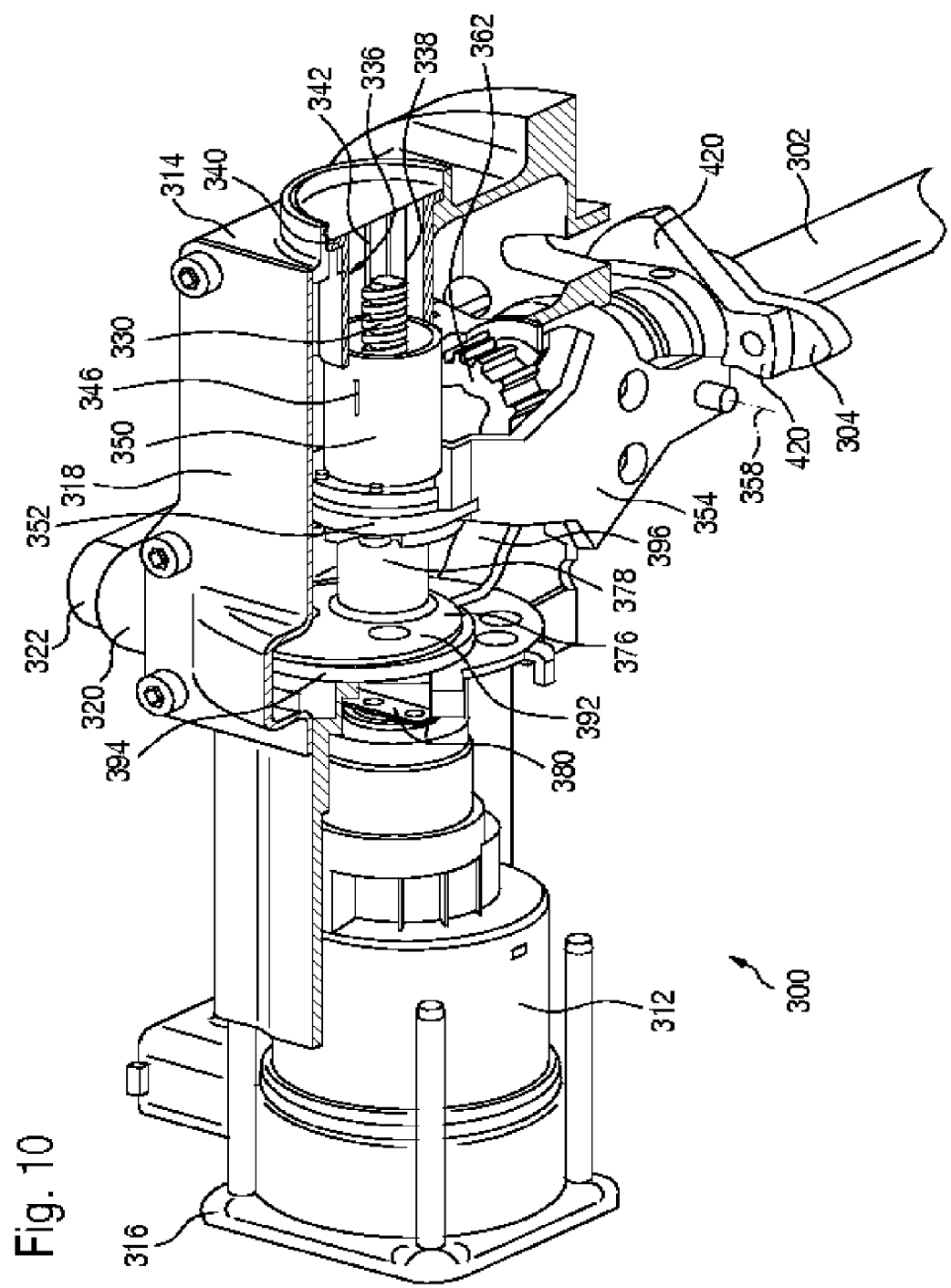
Figure 11A:
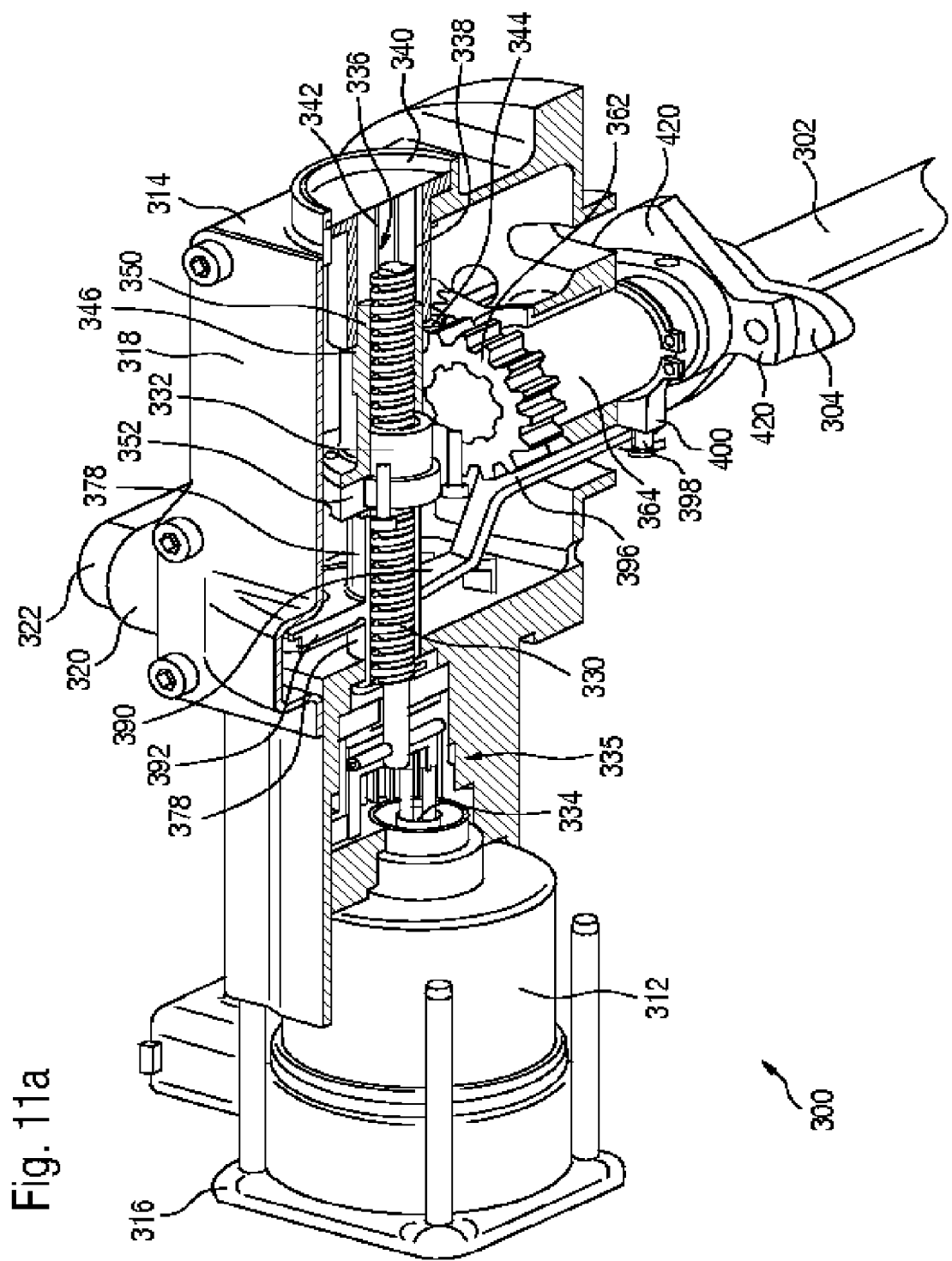
Figure 11B:
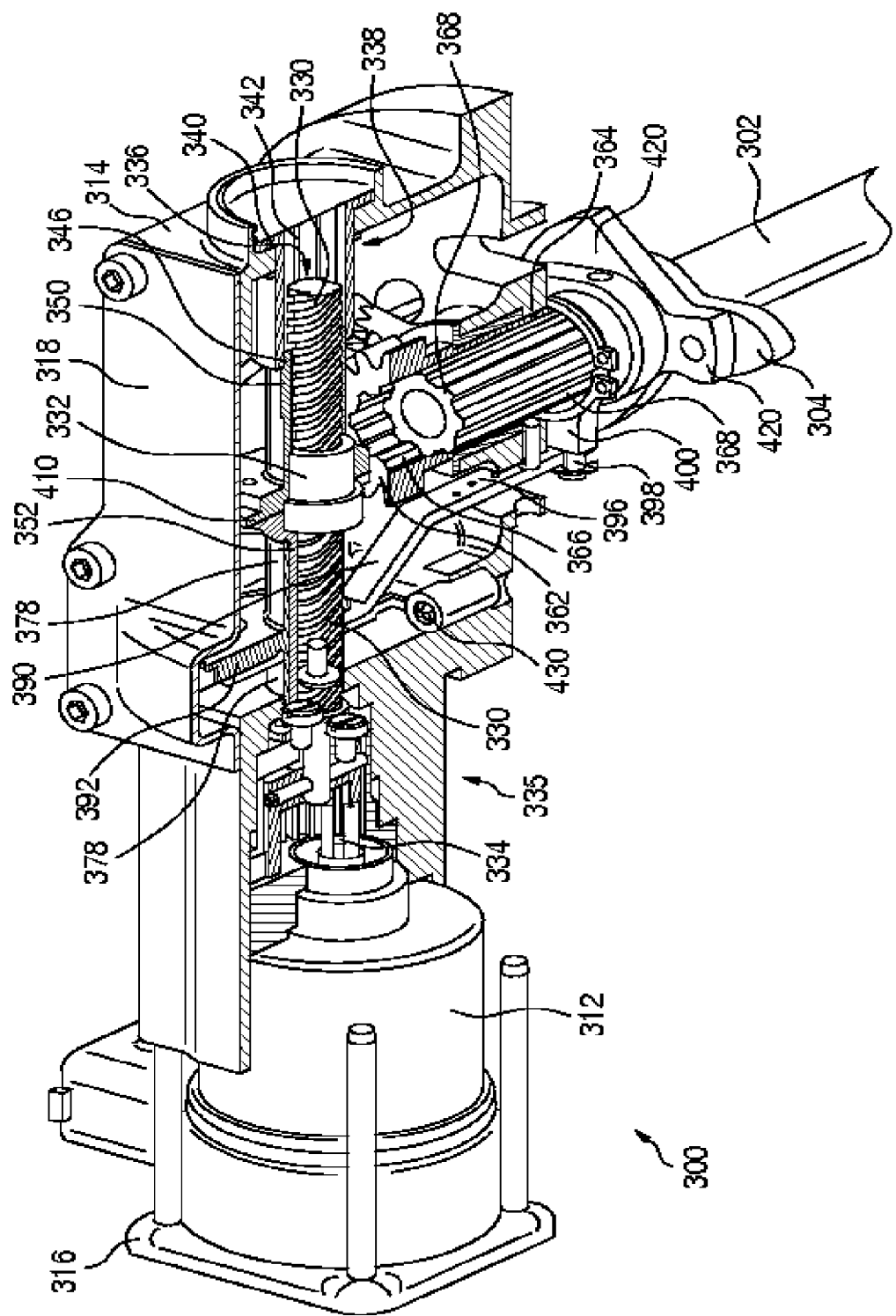
FIG. 11b is a cutaway illustration of the design according to FIG. 9b.

FIGS. 10 and 11a show two cutaway views of the design according to FIG. 9a. FIG. 11b shows a cutaway view of the design according to FIG. 9b.

Figure 12:
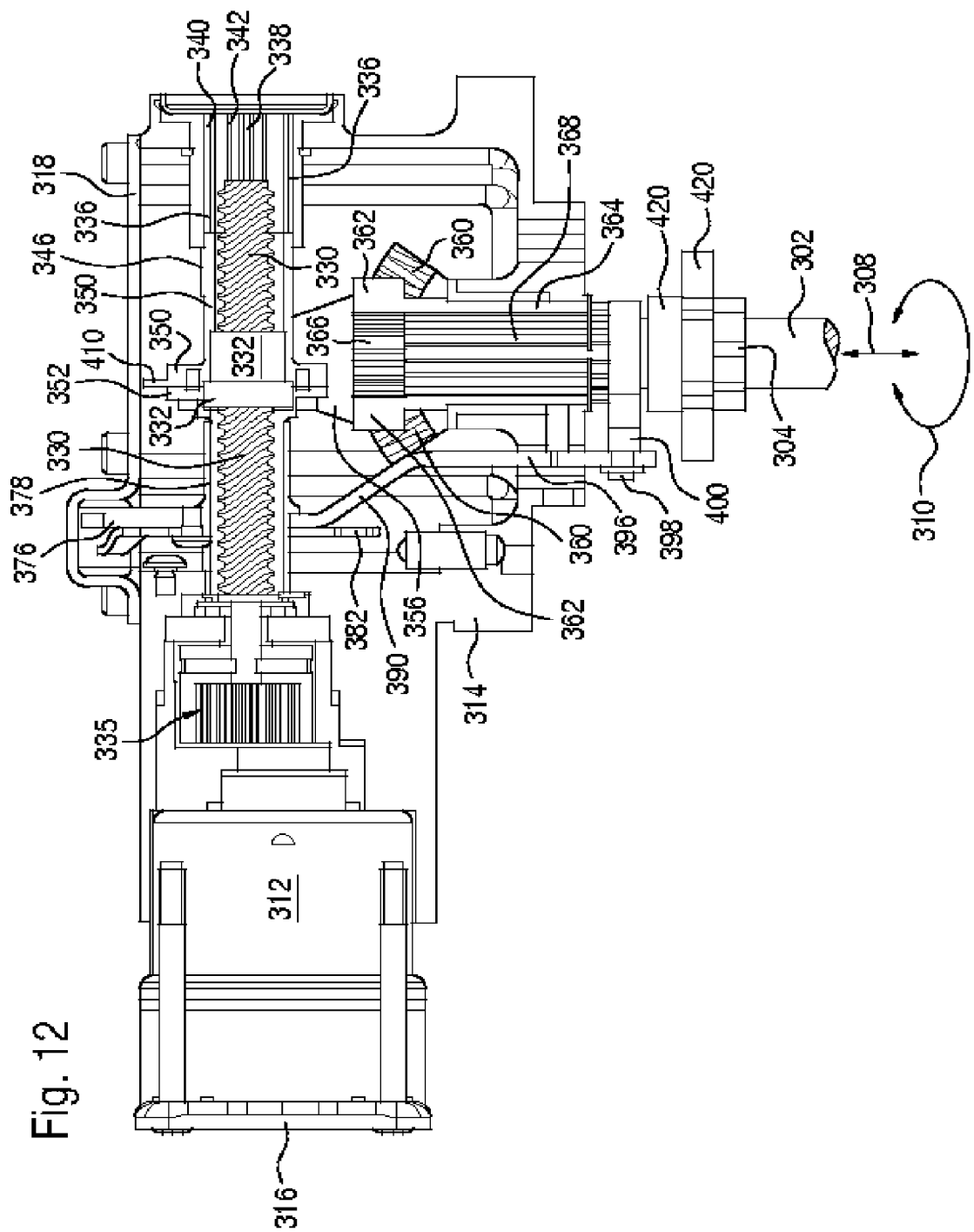

FIG. 12 shows a side or section view of the design according to FIG. 9a.

Figure 13A:
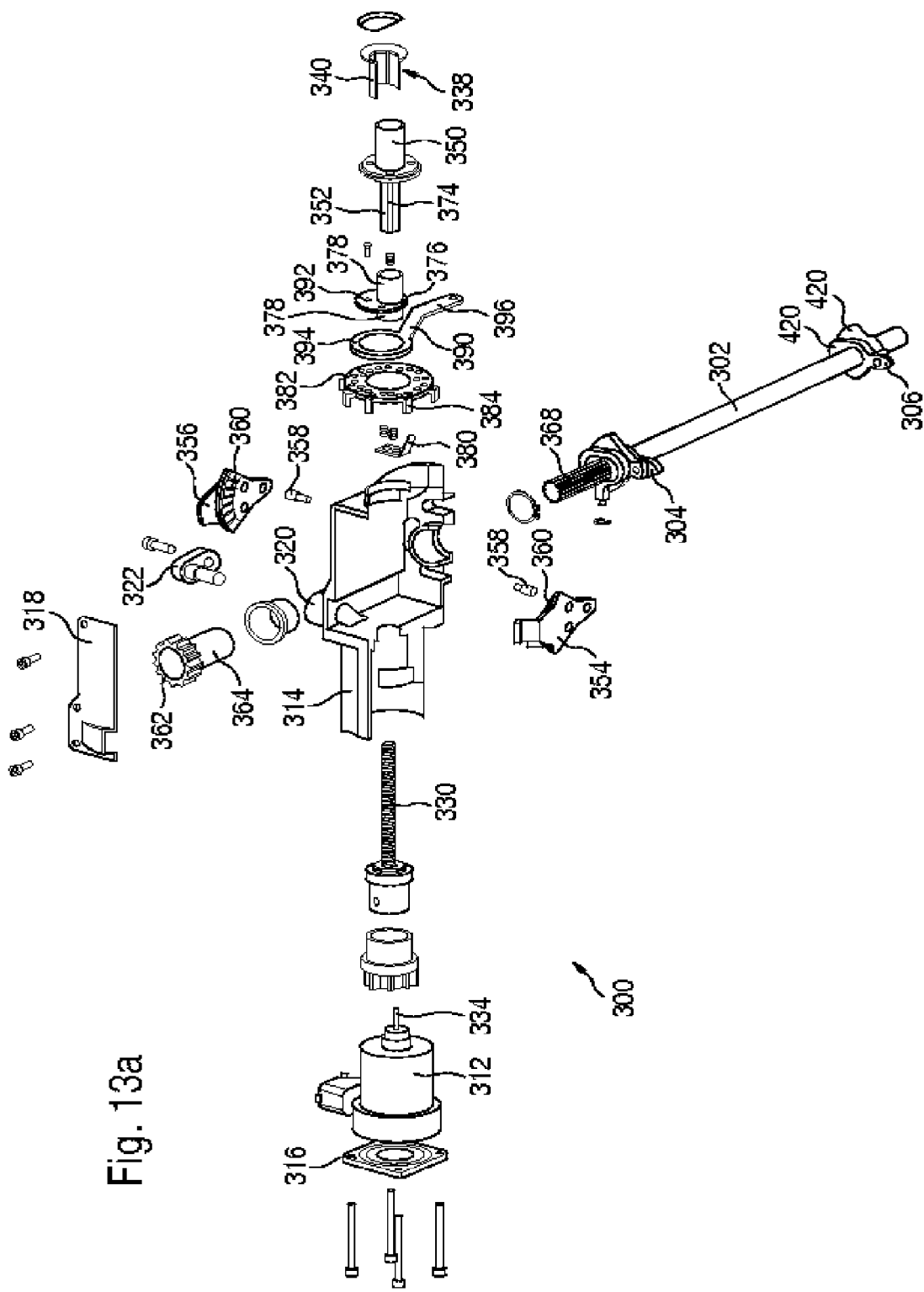
Figure 13B:
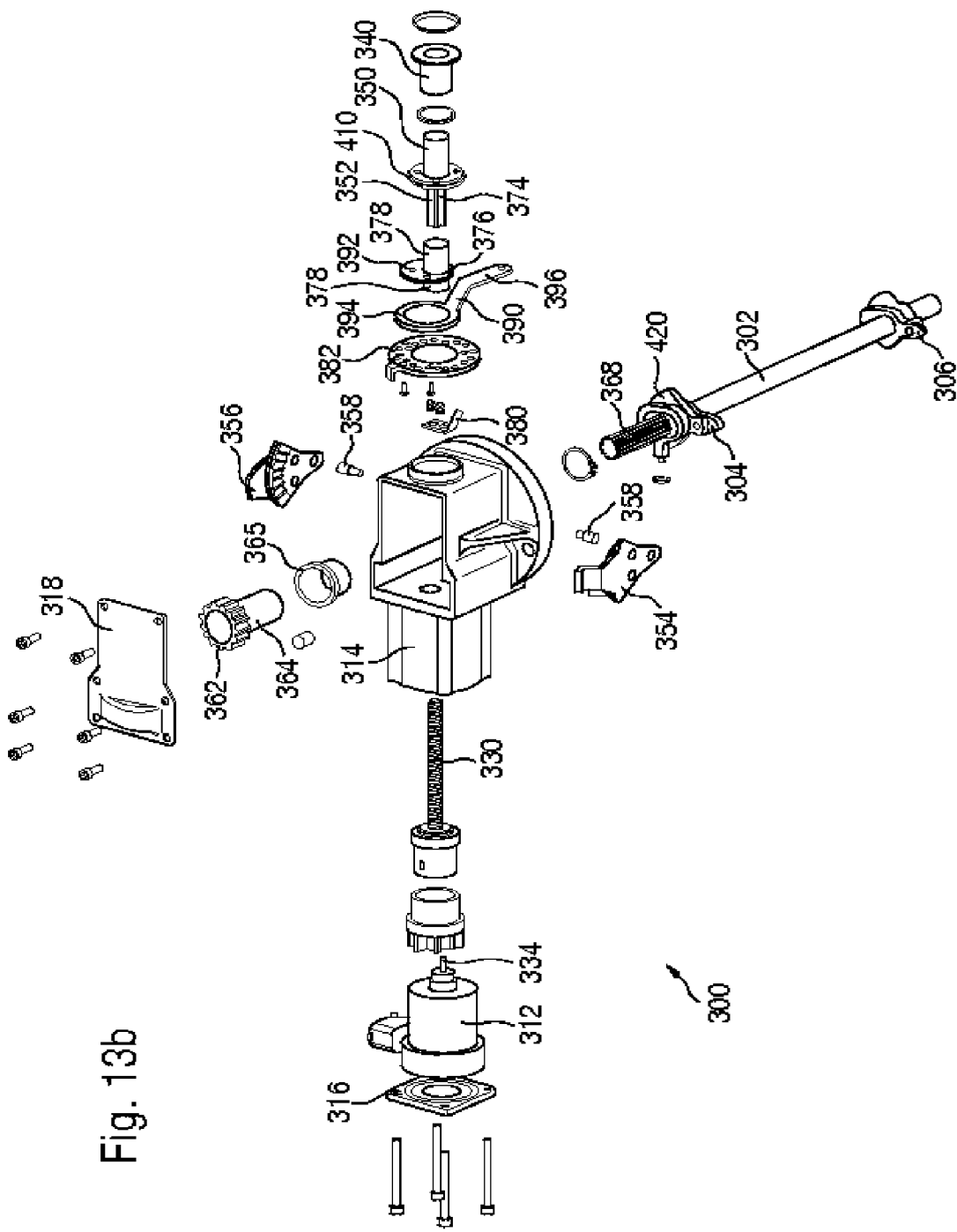
FIG. 13b is an exploded view of the design according to FIG. 9b.
Figure 14:
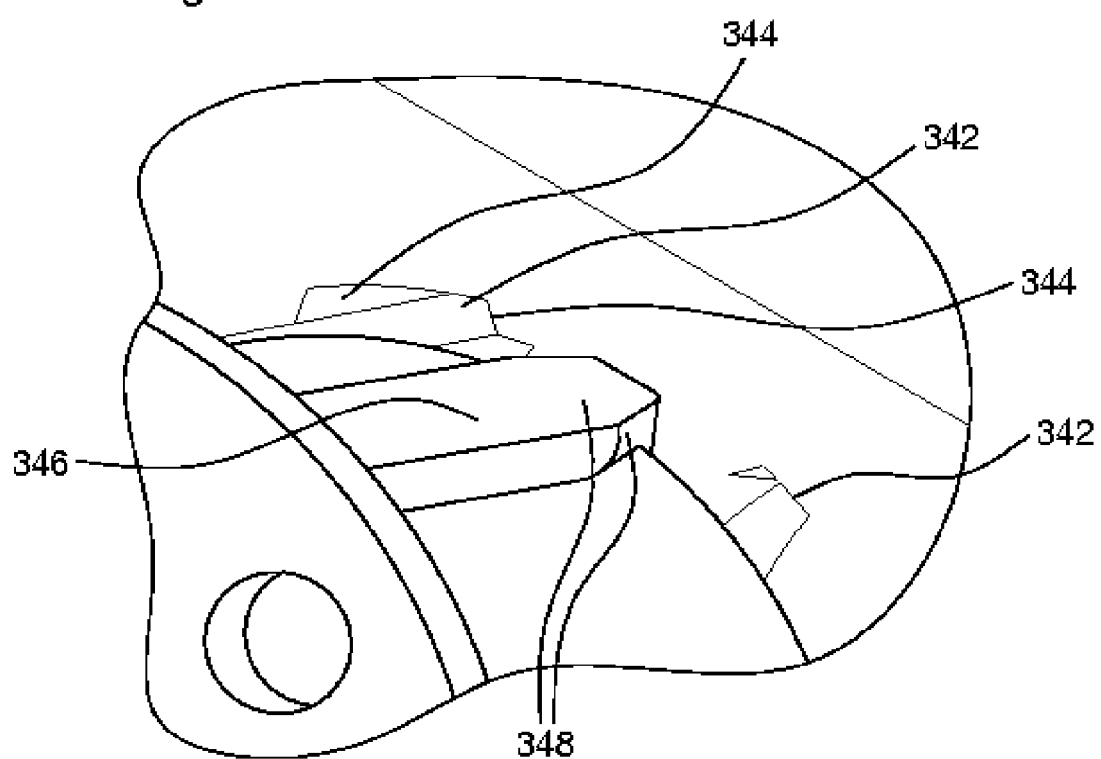
FIG. 14 is an enlarged section in the area of the torsional lock for the designs according to FIGS. 9a and 9b.

FIG. 13a shows an exploded view of the design according to FIG. 9a, and FIG. 13b shows an exploded view of the design according to FIG. 9b.

The two variants have a threaded spindle 330 and a nut 332 held by said spindle.

Spindle 330 is mounted in a rotationally mobile and axially fixed manner and can be driven in a rotational manner via electric motor 312.

For this purpose, motor output shaft 334 is coupled with spindle 330 via a gear wheel set 335. This gear wheel set 335 has a gear wheel that is fixedly attached to spindle 330 and a gear wheel that is fixedly attached to motor output shaft 334. Gear wheels that are connected between these may also be provided. Alternatively—but not shown in the figures—it may also be provided that motor output shaft 334 is situated coaxially with spindle 330 and connected thereto.

According to the variation of the exemplary embodiment, spindle 330 is disposed parallel to motor output shaft 334 and specifically offset in the radial direction.

Electric motor 312 can be driven in both orientations of the rotational direction of output shaft 334, so that it is possible to drive—likewise in both orientations of its rotational direction—according to spindle 300.

When spindle 330 turns, it is also possible to cause spindle nut 332 to migrate in the longitudinal direction of spindle 330. This is especially true if spindle nut 332 is not in a stop position, which will be explained further below.

Moreover, a torsional lock 336 for spindle nut 332 is provided. This torsional lock acts at least over a certain axial range of the axial displacement area of nut 332. However, at least in a stop position of nut 332, which will be discussed more below, nut 332 is turned with spindle 330. When the torsional lock is operational, it is guaranteed in particular that nut 332 is moved in an essentially purely axially manner or migrates in the spindle's longitudinal direction when spindle 330 turns.

Torsional lock 336 has a splining 338 fixedly disposed on the housing. This splining 338 has a recess for each shift position, each of which is formed in particular of adjacent splines or teeth around the perimeter. Splining 338 in the exemplary embodiment is an interior splining, which is provided on a sleeve-like component of housing 314 that in particular is inserted in housing 314.

Furthermore, torsional lock 336 has a component 350, which in this case is likewise sleeve-like and is disposed on nut 332. This sleeve-like component 350 has a spline or tooth on its outer perimeter. The "splines" or "teeth" 342 of splining 338 that are disposed on the housing have insertion tapers 344 that are disposed on the end of splining 338 that faces nut 332.

Spline or tooth 346, which is disposed on nut 332 or connected thereto, also has insertion tapers 348. This may be easily inferred from FIG. 14. The cooperation of insertion tapers 344, 348 facilitates the engagement of the torsional lock and in particular if nut 332 is moved back from a stop position. In the engaged position, tooth 346 forms an essentially interlocking connection—in particular in the circumferential direction of the spindle longitudinal axis—with splining 338.

Figure 15:
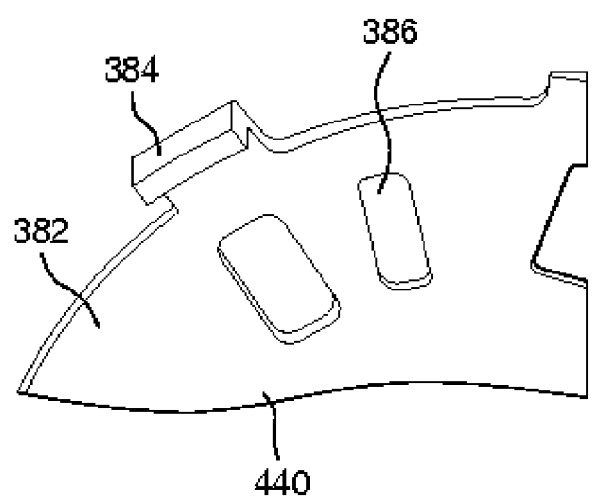
FIG. 15 is an enlarged section in the area of another torsional lock acting in one direction in the design according to FIG. 9a, this torsional lock acting in one direction also being in a similar design for the design according to FIG. 9b.

In particular, apart from the engagement of torsional lock 336, a torsional lock acting in one direction can be operational and will be explained more below in reference to FIG. 15 among other things.

In principle it is possible that tooth 346 is disposed directly on nut 332 or is monolithically connected to it.

It is provided in the exemplary embodiment that spline or tooth 346 is disposed on a sleeve 350 that is separate from nut 332, but connected thereto. Nut 332 is radially trapped within sleeve 350. Furthermore, there is another sleeve 352 in the design according to the exemplary embodiment that can also be designed in particular in a disk-like shape and is connected to sleeve 350. Nut 332 is axially trapped within the unit made of sleeves 350 and 352 and specifically essentially without play or with little play. Furthermore, an appropriate element, such as a fitted key and groove joint or the like, may be provided between sleeve 350 and nut 332 for the torsional lock.

In the design according to the exemplary embodiment, it is provided that nut 332 has a torus-like section that in this case is cylindrically designed and which forms the part of nut 332 that is axially trapped within the unit made up of sleeves 350, 352.

If nut 332 is axially moved under the effect of spindle 330, sleeves 350, 352 are moved accordingly.

Sleeves 350, 352 can, for example, be screwed together, as shown in FIG. 10.

In the exemplary embodiment, an axial movement of nut 332 can be converted into a swiveling or rotational movement of shifter shaft 302. For this purpose, swiveling levers 354, 356 can be swiveled about a (bolt or) swiveling axis 358 that is situated transverse to, and in particular perpendicular to, spindle 330 and transverse or perpendicular to shifter shaft 302. Shifter shaft 302 extends essentially perpendicular to the longitudinal axis of spindle 330.

In a particular area that faces away from swivel axis 358, one of swiveling levers 354, 356—alternatively—engages spindle nut 332 or an engagement area of one of the two sleeves 350, 352. This engagement is of a type such that an axial movement of nut 332 effects a swiveling of the particular swiveling lever 354 or 356 that is engaged.

The swiveling levers 354, 356 each have a toothed quadrant 360 that is easily recognizable in FIG. 12. These two toothed quadrants 360 each engage pinion or gear 362 and in particular in such a manner that when the swiveling lever 354 or 356 that is engaged at the time in the nut swivels, this gear 362 is loaded in its rotational or swiveling direction and in so doing entrains the swiveling lever 356 or 354 that is not engaged at the time in the nut or sleeve by its toothed quadrant 360. In the exemplary embodiment, swiveling levers 354, 356 are disposed on opposite sides of the toothed wheel 360. Swiveling levers 354, 356 consequently each swivel in opposite swiveling directions. Because only one of the two swiveling levers 354, 356 engages in nut 332 or one of the two sleeves at a time, there is mobility despite the swiveling of swiveling levers 354, 356 in opposite directions.

Gear wheel 362 is disposed in the exemplary embodiment on a sleeve or hollow shaft 364, which is easily recognizable in FIG. 12. This sleeve or hollow shaft 364—in particular via a plain bearing bush 365—is mounted in a rotationally mobile and axially fixed manner in housing 314. On its interior surface, hollow shaft 364 or gear wheel 362 has a spline toothing 366 that engages in spline toothing 368 provided on the outer casing of shifter shaft 302.

The system makes it possible, when threaded spindle 330 turns and thereby causes an axial displacement of nut 332, for shifter shaft 302 to be swiveled to shift gears via the engagement of a particular swiveling lever 354 or 356 in nut 332 and via the cooperation of toothed quadrant 360 with gear wheel 362, which in turn cooperates via its spline toothing 366 with toothing 368 of shifter shaft 302, the shifter shaft 302 nevertheless being disposed in an axially displaceable manner. However, it should be remarked that instead of this preferred and very special system, another system may also be provided by means of which it is achieved that shifter shaft 302 on the one hand can be loaded for shifting in the swivel direction and on the other hand is nevertheless disposed in an axially displaceable manner.

Figure 16A:
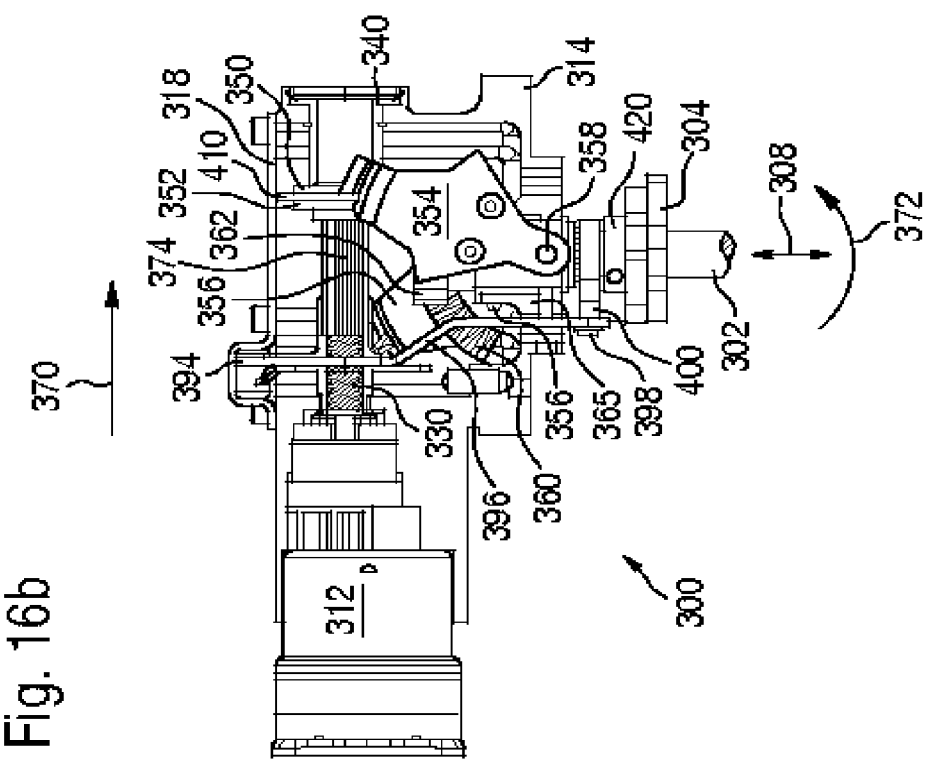
FIGS. 16a and 16b show two views in reference to which the shift movements for shifting gears of a transmission via the design according to FIG. 9a or 9b are explained.
Figure 16B:
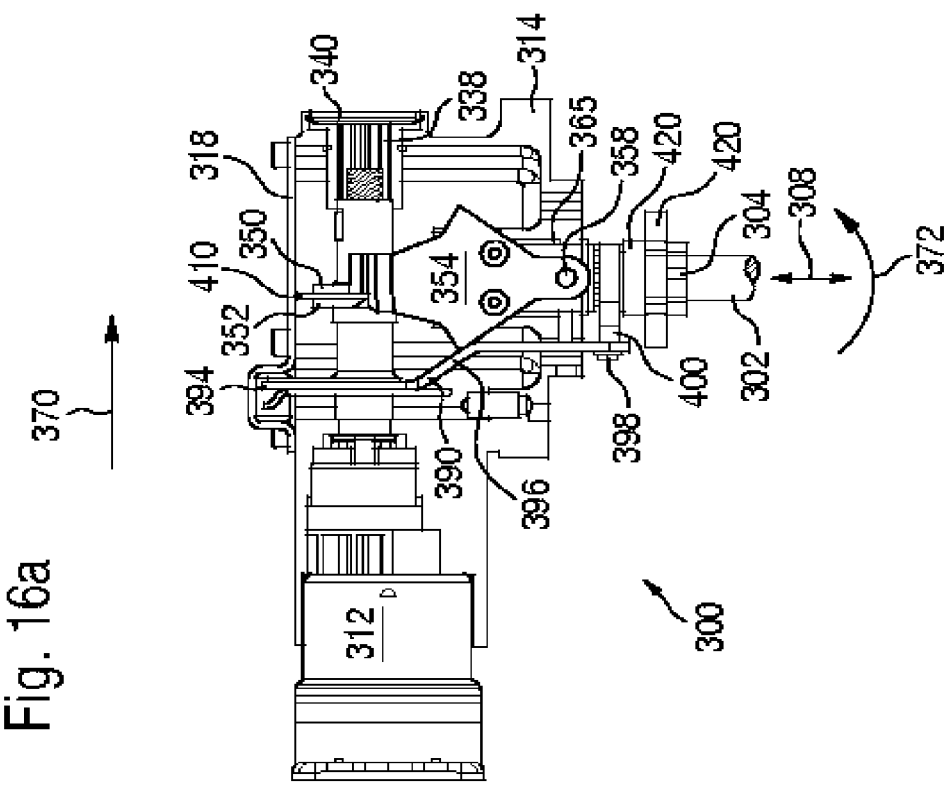

The shifting movement for the engagement of gears can also be easily recognized in reference to surveying FIGS. 16a and 16b. In FIG. 16a, nut 332 is pushed to the right with sleeves 350, 352 as a result of a corresponding rotation of threaded spindle 330, as diagrammatically indicated by arrows 370, which show the movement of nuts 332 to shift into a gear. By engagement with swiveling lever 354, this swiveling lever is swiveled so that gear wheel 362 has turned accordingly and has swiveled the other swiveling lever in the opposite direction. By engagement of spline toothing 366 with spline toothing 368, shift finger 304 is swiveled in the design according to FIG. 16b compared to the design according to FIG. 16a, because the shifter shaft—corresponding to arrow 372—is swiveled accordingly.

It may also be inferred from FIG. 16b—as also, for example, from FIGS. 13a and 13b—that a rotary slaving device 374, which is designed in this case as a spline-toothed hollow shaft type of extension, is disposed on the second sleeve 352 of nut 332. The diameter of these hollow shafts in this case is such that spindle 330 essentially extends through the interior space of this hollow-shaft-like extension.

This rotary slaving device 374, which, however, may also be designed differently, is used in particular to produce a rotationally fixed connection with an eccentric 376. This eccentric 376 is situated in such a manner that its rotational axis is essentially concentric with the rotational axis of spindle 330. It has, for example—as in the exemplary embodiment—a hollow cylindrical sleeve-like section 378, that is essentially concentrically situated in relation to the rotational axis of spindle 330. An (eccentric) disc 392 is disposed eccentrically on this sleeve-like section 378. The sleeve-like section 378 has on its inwardly situated inner surface a counter-rotary slaving device or a counter-spline toothing that is engaged with the rotary slaving device 374 or spline toothing 374, and in particular continuously and in particular such that there is an axial displaceability. Eccentric 376 in other respects is mounted with respect to housing 324 in a manner rotatable about its swiveling axis.

If threaded spindle 330 is then driven by electric motor 312 in its one rotational direction or orientation, spindle nut 332 migrates axially in its one orientation (see FIGS. 16a, 16b) and thus causes a corresponding swiveling of shift finger 304. If spindle 330 (subsequently) is driven in an opposite rotational direction or orientation, shift finger 304 is accordingly swiveled back. In the process nut 332 accordingly moves back in its axial direction. A friction device may be provided that acts on the eccentric during this movement of nut 332 in the direction of this eccentric, so that in this context it is essentially not turned as long as the nut is moved in a purely axial direction of the eccentric, it being provided that the corresponding frictional force (or frictional moment) is great enough to ensure that during a corresponding spindle rotation nut 332 is moved increasingly in the direction of the eccentric and specifically in the direction of a stop position.

Such a stop for nut 332 is formed by eccentric 376. The eccentric in this context is mounted in an axially fixed rotatable manner.

Alternatively, an appropriate stop for nut 332 may also be provided on housing 314. Such a stop disposed on housing 314 may be designed, for example, as a plain bearing bush, or have an axial bearing—especially an axial rolling bearing. Such a bearing may be used, for example, to reduce frictional forces.

If—as is not shown in FIGS. 9a to 21—a stop for nut 332 is disposed on housing 314, a stopping of nut 332 on such a stop disposed on housing 314 makes it so nut 332 is unable to move any further in the direction of the eccentric when spindle 330 turns. Then a torque can be transmitted to the eccentric via spline toothing between nut 332 and the eccentric, as a result of which the eccentric is driven by nut 332, and which suffices to overcome the frictional force (or frictional moment) of any frictional device. It is noteworthy that in this stop position the torsional lock 336 no longer operates. Tooth 346 has therefore been axially removed from spline toothing 338, so that nut 332 is moved in a rotary fashion in the stop position as a result of the spindle loading and—as discussed—entrains the eccentric.

If such a stop is not disposed on housing 314, but is formed by eccentric 376 itself, which, however, is axially supported against housing 314 in the exemplary embodiment, nut 332 is hindered from further axial movement by this stop against eccentric 376 and entrains—supported by the slaving device or spline toothing 374—eccentric 376. With this slaving device, the holding force of the friction device is overcome.

This frictional device is formed by a spring element 380 fixedly mounted on the housing and a disk 382. This spring element 380 and this disk can form a one-way clutch acting in one direction, which is explained more below.

It should be noted that a stop for nut 332 may also be formed differently and may in particular be supported against housing 314.

Figure 17:
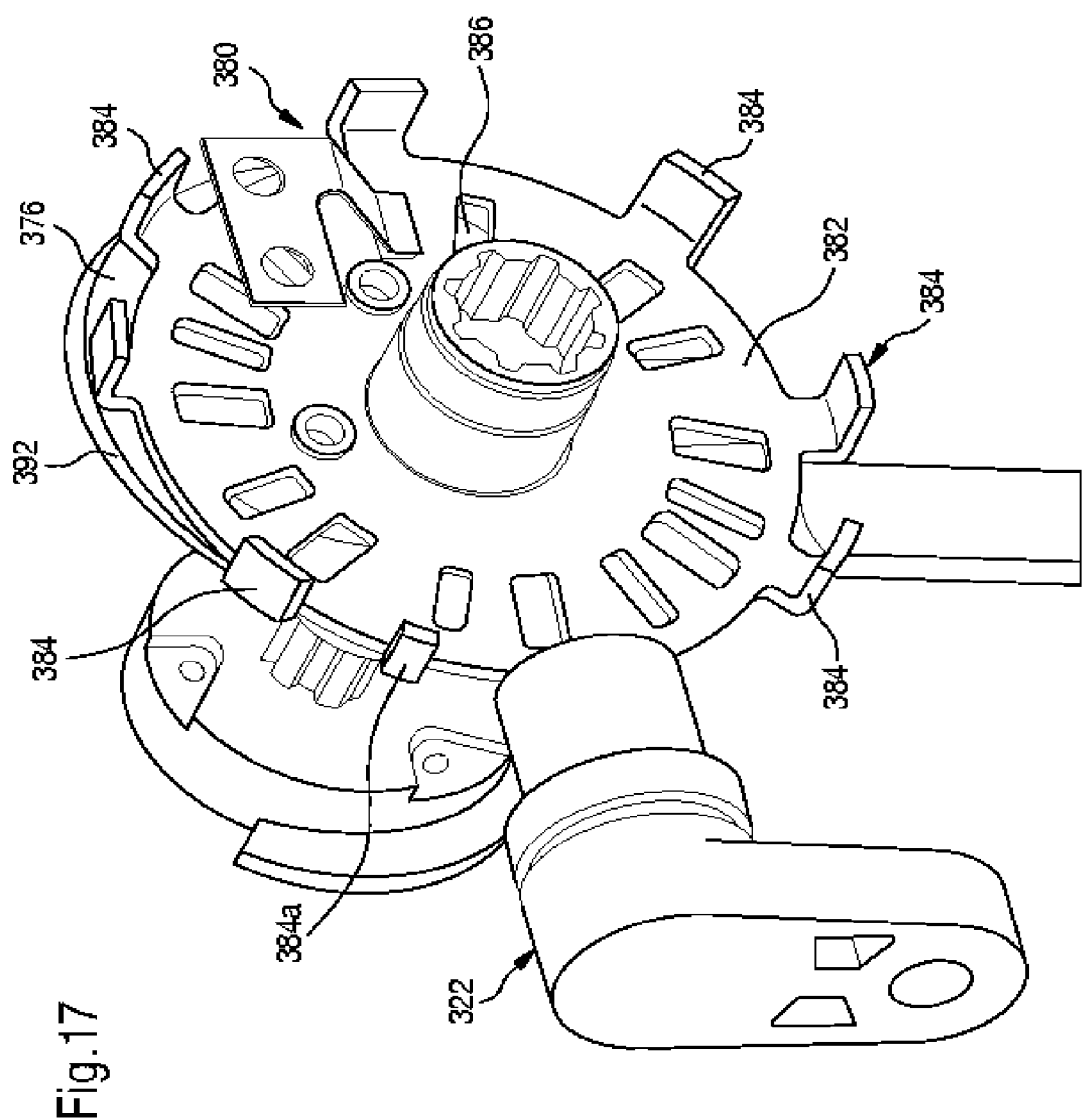
FIG. 17 shows a one-way clutch acting in one direction and a sensor that is present in the design according to FIG. 9a, the one-way clutch and a corresponding design also being present in the design according to FIG. 9b.

Spring 380, which acts in particular in one direction, and disk 382 are easily recognizable in FIG. 17. FIG. 17 also shows in particular the sensor device of the variation with sensor. There, it can be recognized that around the perimeter of disk 382 a plurality of sensors or axial projections 384 are disposed on disk 382. They extend essentially axially and in particular on the outer perimeter of disk 382. Projections 384 can, for example, be essentially evenly distributed around the perimeter and/or have equal spacing in the circumferential direction. However, there is a projection 384a that deviates in its perimeter extension and/or in its distance from adjacent projections or from one adjacent projection to the others. This projection 384a may be used in cooperation with Hall sensor 322 to determine a reference position. Disk 382 is rotationally fixedly connected to eccentric 376 and is disposed essentially coaxially with respect to the rotational axis of eccetric 376.

In the variation without a sensor, a disk 382 and a spring 380 that is fixedly mounted on housing 314 are also provided. In this design without a sensor, projections 384, 384a as well as Hall sensor 322 are lacking. Apart from projections 384, 384a, disk 382 in the design according to FIG. 9b is essentially just like in the design according to FIG. 9a.

Disk 382 has a plurality of recesses or openings 386 in which a tongue 388 of spring element 390 can engage. This tongue 388 is designed in such a manner that spring element 380 and disk 382 cooperate as a one-way clutch that acts in one direction. This one-way clutch acting in one direction operates in such a manner that disk 382 and with it eccentric 384 can be rotationally entrained by nut 332 if nut 332 is turned against the stop. In the opposite direction, thus, if nut 332 turns away from the stop and distances itself from it axially, the one-way clutch blocks a turning of disk 382 in the corresponding rotational direction and with it a turning of eccentric 382 in this rotational direction. Rotational positions in which the one-way clutch locks are, in the process, harmonized with the select position from which it is possible to shift into a gear.

A catch 390 engages in eccentric 376. In the exemplary embodiment, eccentric 376 has an eccentric disk 392 that is circular and is disposed in an eccentric way on sleeve 378. In the exemplary embodiment, a ring flange 394 of catch 390 radially encompasses eccentric disk 392 on the outside, this ring flange 394 being rotatably mounted in relation to eccentric disk 392. A guide lever 396 that is connected to shifter shaft 302 in an area that faces away from the ring flange 394 extends from this ring flange 394. This connection between shifter shaft and the guide lever is such that the shifter shaft 302 on the one hand is not blocked from its rotational movement, and on the other hand the axial position of shifter shaft 302 (for the "select") can be displaced via catch 390. For example, a bolt 398 that is disposed in an essentially axially fixed manner on or in relation to the longitudinal axis of the shifter shaft can engage in guide lever 396 in a rotationally mobile manner.

This bolt 398 can be, for example, fixedly disposed on a sleeve that is axially fixedly mounted on or in relation to shifter shaft 302 in such a manner that shifter shaft 302 can be rotated within this sleeve 400.

If, then, by appropriate rotation of spindle 330, nut 332 is moved into its stop positions and spindle 330 rotates further in the corresponding rotational direction, nut 332, at an essentially unchanged axial position, entrains eccentric 376, which in turn entrains catch 390 via the engagement with this catch 390, and specifically in such a manner that this catch 390 loads and can move shifter shaft 302 in its axial direction via its engagement in the shifter shaft 302. This can also be easily recognized in reference to FIGS. 18a and 18b in which eccentric 376 is shown in different illustrations so that catch 390 is shown in different positions. There, it can be recognized in the comparison that bolt 398, seen in the axial movement direction of shifter shaft 302, has different axial positions. The axial movement direction of the shifter shaft is diagrammatically indicated in these FIGS. 18a and 18b by double arrow 308. This axial displacement of shifter shaft 302 can thus effect the selection in a transmission. The axial movement of shifter shaft 302 thus corresponds to a select movement.

It is provided in particular that a continued turning of nut 332 against its stop causes shifter shaft 302 to be moved axially back-and-forth via the eccentric or guide lever 396.

In FIG. 18a and FIG. 18b, the rotational direction of eccentric 376 is that diagrammatically indicated by arrow 404. It is noteworthy that the movement in the counter direction is blocked via the one-way clutch that acts in one direction already discussed above or at least is blocked after a relatively small movement. If a desired selection position of shifter shaft 302 is reached by turning of eccentric 376, electric motor 312 is driven (back) in the opposite direction so that nut 332 is moved away from its stop position or is moved away from eccentric 376. At the latest in this context, the one-way clutch that acts in one direction latches so that the nut is then secured against turning and is moved in an essentially purely axial manner via the spline toothing on second sleeve 352 and the sleeve-like section 378 of the eccentric. The latching positions of the one-way clutch that acts in one direction are such that tooth 346 is essentially positioned in the swiveling direction in such a manner that it is axially guided into spline toothing 338 or a predetermined recess of spline toothing 338 that is situated between teeth or splines 342. It is provided that the spline toothing 338 is designed in such a manner that a reception area or a recess of the spline toothing 338 for reception of tooth 346 is provided for each shifting position.

For each shifting position or for each gear or for each select position from which it is possible to shift into a gear there is an interlocking connection of the nut with the housing relative to the rotational direction of nut 332.

As a function of the axial position of the shifter shaft or as a function of the latched position of the one-way clutch that acts in one direction, sleeve 350 or sleeve 352 or spline or tooth 346 has different swivel positions with respect to its rotary axis.

As a function of this swivel position in the circumferential direction of first sleeve 350 or second sleeve 352 or spline or tooth 346 or an engagement area 410 disposed on one of sleeves 350, 352 for swiveling levers 354, 356, the swivel direction of shifter shaft 302 or shift finger 304, 306 is determined when spindle 330 turns for the shifting. In the exemplary embodiment, this is such that on first sleeve 350, which is mounted on nut 332, a ring flange that partially covers the circumferential direction is provided that forms engagement area 410 and can be engaged with either swiveling lever 354 or swiveling lever 356. For this engagement, the swiveling levers each have a fork-shaped or groove-shaped section or the like. These sections are positioned in a neutral position, which corresponds to a stop position of nut 332, such that, during an essentially purely rotational movement of nut 332, the engagement area or the engagement area 410 that partially but not completely extends in the circumferential direction or that projects radially can move from the groove-shaped or fork-shaped area of the one swiveling lever 354 into the groove-shaped or fork-shaped area of the other swiveling lever 356, and vice-versa. As a function of the swivel position of this engagement area 410 (in the stop position of nut 332), one or the other of swiveling levers 354, 356 is engaged via spindle 330 with engagement area 410 of sleeve 350 or with nut 332 via its fork-shaped or groove-shaped area when nut 332 is loaded in the direction facing away from the stop, so that this engaging swiveling lever 354 or 356 corresponding to the movement of nut 332 is swiveled if nut 332 is moved away from its axial stop position or from its axial stop or follows the movement of the nut.

If the nut then or thereafter is moved back in the direction of the stop position, this swiveling lever 354 or 356 which is engaged with the nut or engagement area 410 or the ring flange is accordingly moved back or swiveled back. Gear wheel 362 is conjunctively turned via tooth quadrant 360, which was previously discussed and is located on this swiveling lever 354 or 356 that is engaged with nut 332 or engagement area 410. Because this gear wheel 362 simultaneously engages in the swiveling lever 354 or 356 that is disposed on the opposite side via its tooth quadrant 360, any other swiveling lever 354 or 356 is swiveled to it running counter to the swiveling lever 354 or 356 that is engaged with the nut or is found in engagement area 410.

This other swiveling lever 354 or 356, which is co-swiveled or driven by each of swiveling levers 354 or 356 via gear wheel 362 corresponding to an "idle stroke". In this context it does not engage in nut 332 or in engagement area 410. Depending on which of these swiveling levers 354, 356 disposed opposite gear wheel 362 is currently engaged in nut 332 or in engagement area 410—in particular as a function of the rotational direction of spindle 330—as a result of which gear wheel 362 is driven either clockwise or counterclockwise via a tooth quadrant 360 of one of the swiveling levers. Accordingly, shift finger 304 or 306 is swiveled clockwise or counterclockwise starting from the neutral position as a function of the swiveling lever 354 or 356 that is currently engaged with nut 332 or engagement area 410. However, it is noteworthy that it is possible to act on gear wheel 362 or shift finger 304 or 306 in the clockwise or counterclockwise direction via, respectively, engagement of swiveling lever 354 or 356. The difference is whether, when starting from the neutral position of the shift finger or shifter shaft, gear wheel 362 or shift finger 304 or 306 or shifter shaft 302 is first acted on in the clockwise direction or first acted on in the counterclockwise direction.

Using the system, it is thus possible to move the appropriate selector rail—depending on which swiveling lever is engaged in nut 332 or engagement area 410—into an excursion position in one or the other orientation of its axial direction via a particular shift finger 304 or 306 starting from the neutral position of the corresponding shift finger 304 or 306. In this context it is provided in particular that a select movement takes place in the actuating apparatus between the excursion starting from the neutral position of such a selector rail in the one orientation of its axial direction and the excursion likewise starting from the neutral position in the other orientation of the axial direction, that is, the shifting of a first gear of the transmission assigned to this selector rail and the shifting of a second gear assigned to this selector rail. Therefore, it is provided in particular that a select movement takes place not only to displace the shift finger for the effect on another selector rail, but also to switch the orientation in which the same selector rail in each case is acted on to engage a gear.

The neutral position at which engagement area 410 can change from an engagement position in swiveling lever 354 into an engagement position in swiveling lever 356 via purely rotational movement of nut 332 in its stop position or vice-versa is shown in FIG. 16*a*. FIG. 16*b* shows that swiveling lever 354 engages in engagement area 410 and as a result, when there is an axial movement of nut 332, is accordingly swiveled in conjunction, while the other swiveling lever 356 is swiveled in the other direction driven by gear wheel 362 quasi according to an idle stroke. If then swiveling lever 356 were to be engaged with nut 332 or engagement area 410 instead of swiveling lever 354 (not shown), swiveling levers 354, 356 would each be swiveled opposite the illustration according to FIG. 16*b*, so that the rotational direction of the shifter shaft that is indicated by arrow 372 would be oriented in the opposite direction.

Figure 19:
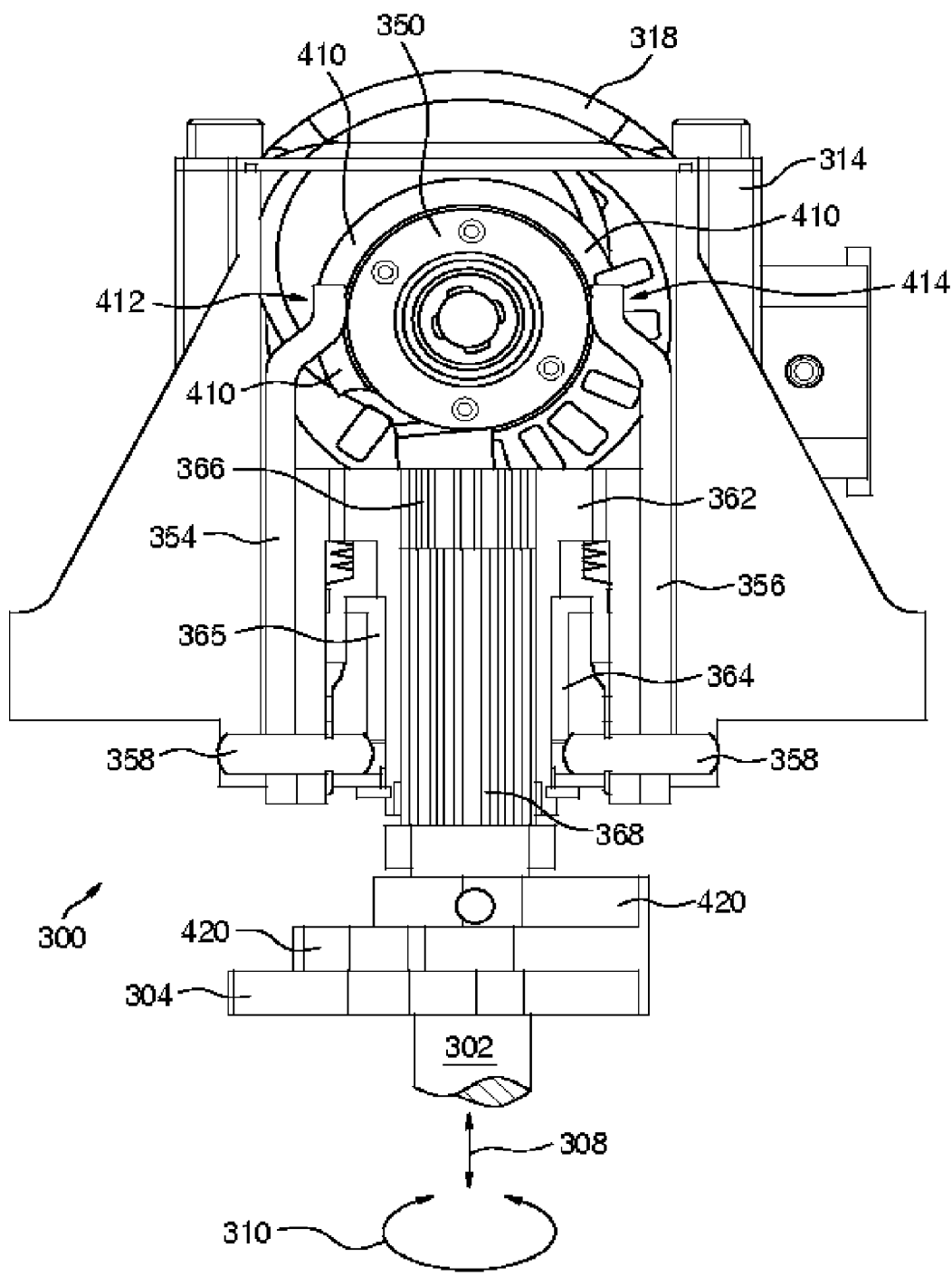
FIG. 19 shows a view of the design according to FIGS. 9a and 9b.

An exemplary design of engagement area 410 in the engagement position or non-engagement position of swivel lever 354, 356 is easy to recognize in reference to FIG. 19. In FIG. 19 a view of actuating apparatus 300 according to FIGS. 9*a* or 9*b* is shown. There, an end section of the actuator in particular is also shown. In reference to FIG. 19, it is also clearly shown that engagement area 410 does not extend completely in the circumferential direction. This engagement area is positioned in the swiveling direction in such a manner that swiveling lever 354 axially encompasses engagement area 410 and as a result is accordingly axially entrained during an axial movement of nut 332 So that swiveling lever 354 is swiveled about its swivel axis 358.

Engagement area 410 can also be called a gear plate. Arrow 412 in FIG. 19 points to the area in which swiveling lever 354 engages an engagement area 410 or in gear plate 410 or vice-versa. Arrow 414 points to an area in which swiveling lever 356 in this case is out of engagement with engagement area 410 or gear plate 410, so that it can freely swivel in the opposite direction of swiveling lever 354. The rotational direction of shifter shaft 302 is thus established as a function of which of swiveling levers 354, 356 engages in gear plate or engagement area 410.

The embodiment according to FIGS. 9*a* to FIG. 21 is—in both variants—designed in particular as an active interlock design. Thus, it is provided in particular that a transmission may be operated via actuating apparatus 300 in such a way that selection or selection movement can take place before disengagement of the old gear and in particular with an appropriate design of the selector rails of the transmission. These selector rails in this context may be such that they have shift mouthpieces that make it possible for shift finger 304 or 306 to be moved back after engagement of a gear into its neutral position without the gear previously engaged via this shift finger 304 or 306 being removed. Therefore, it is provided in particular that it is not necessary—as in classically designed step transmissions—in gear change operations starting from the old gear, for the following three steps to occur in time sequence: "disengagement of the old gear"—"select"—"engagement of the target gear". Shift finger 304 or 306 is essentially responsible only for the engagement of gears; in this context additional geometries assume the function of disengaging gears. In so doing so-called secondary actuation elements are used for the disengagement function to which at least one part of these geometries is configured. Secondary actuation elements of this type that are disposed on shifter shaft 302 are provided with reference character 420. These secondary actuation elements 420—relative to a particular partial transmission—can each act in gates in which shift finger 304 or 306 is not currently acting. Additional geometries of this type are also provided in particular on the shift mouthpieces of the selector rails of a transmission that can be operated via an actuating apparatus 300, the geometries on the shift mouthpieces being able to act together with those on the selector rails in such a manner that it is ensured that all gears of the same partial transmission are disengaged or blocked before a target gear is engaged in this partial transmission via shift finger 304 or 306.

Figure 20:
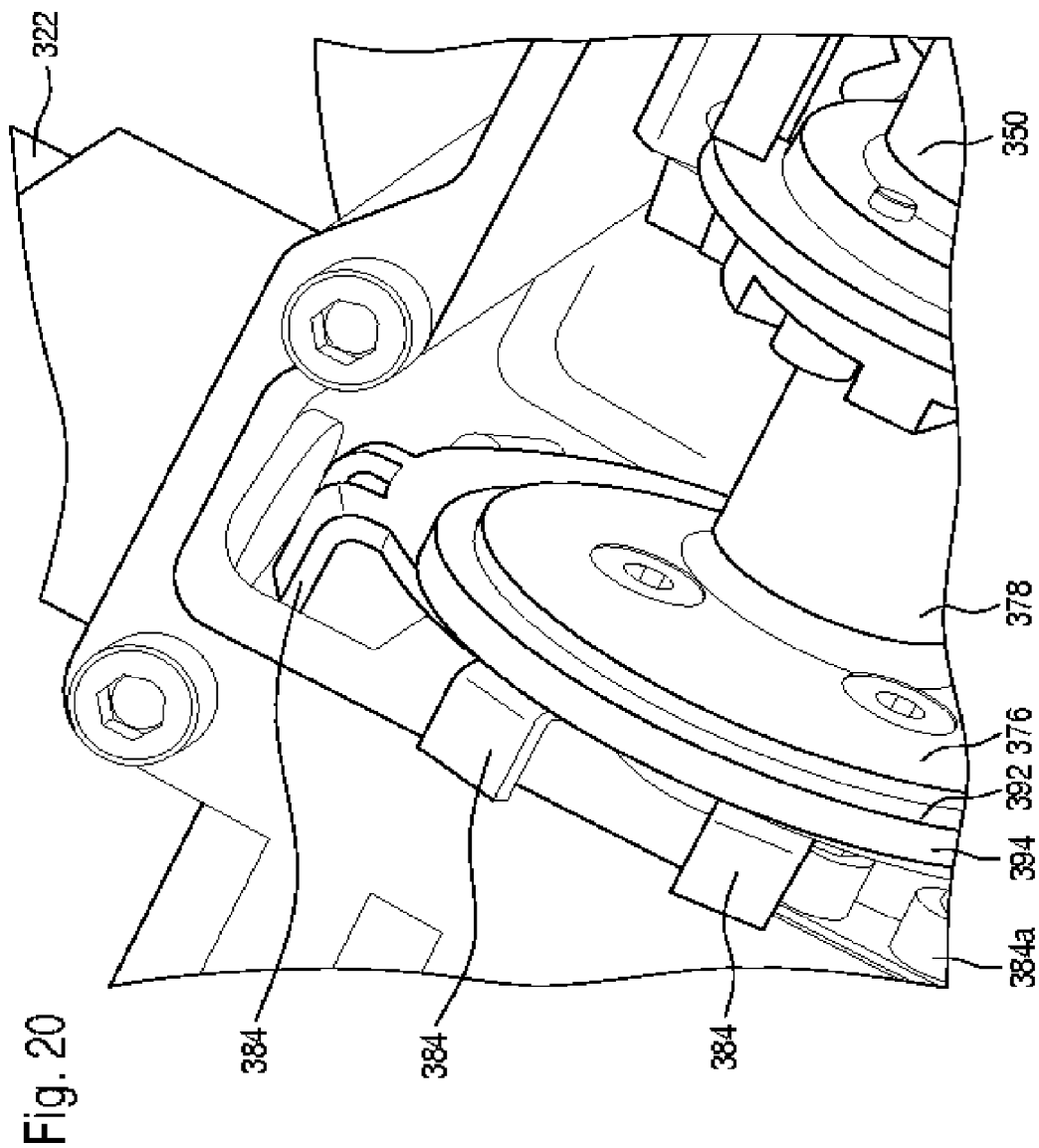
FIG. 20 is an enlarged section of the design according to FIG. 9a, in which a sensor is shown.

FIG. 20 shows an enlarged section of the variation according to FIG. 9*a* in the area of the sensor. Easily recognizable in FIG. 20 are Hall sensor 322 and projections 384 or 384*a*, which can work together with Hall sensor 322 for detection—especially contactless detection—of a reference position or vice-versa.

As discussed, in the variation according to FIG. 9*b*, a sensor with a Hall sensor 322 and sensor projections 384 or 384*a*, which can be used to detect a reference position, are lacking.

Figure 21:
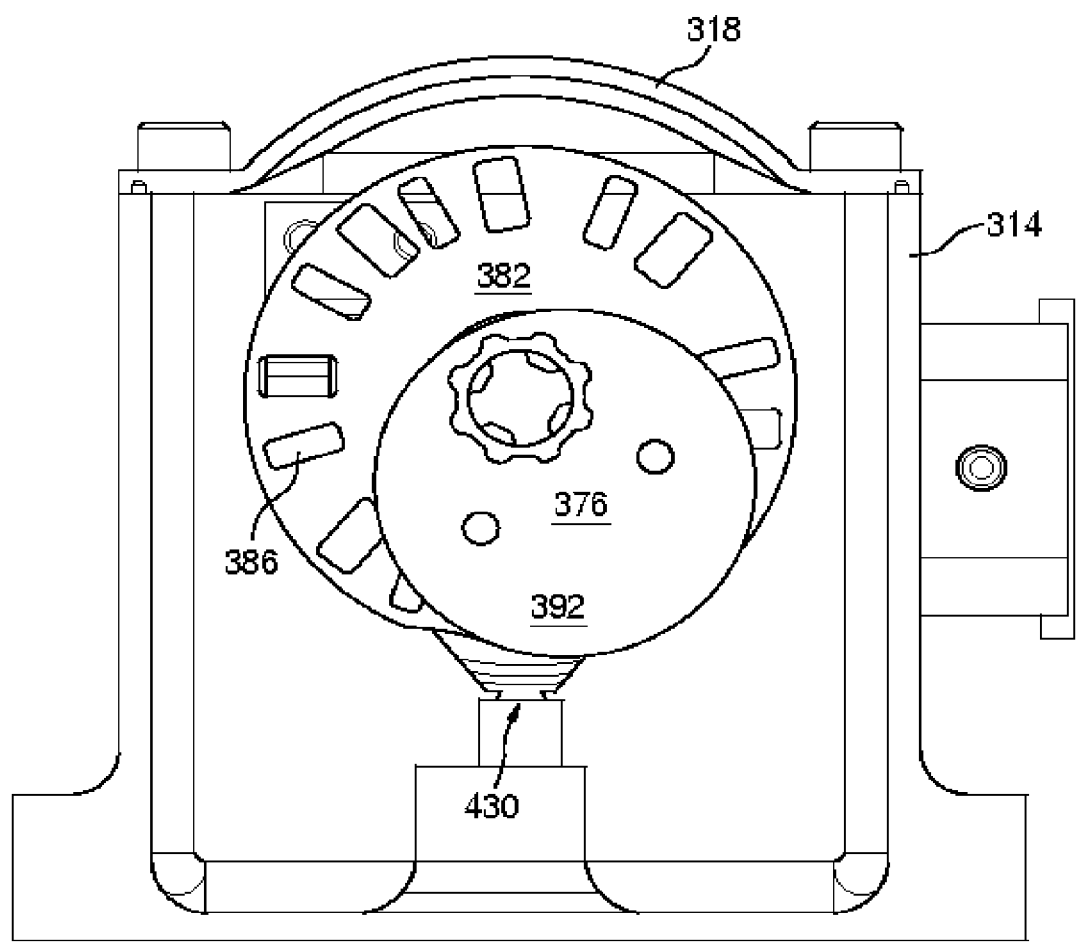
FIG. 21 is an exemplary view in which the one latch is shown, which may be present or is present for determination of the reference position in the variation according to FIG. 9b; and, FIGS. 22 to 24 illustrate another exemplary design according to the invention that can be used in particular to produce the shift movements of the shift finger alternatively in the design according to FIGS. 9 to 21 (for both variations) in section view.

Instead, in the variation according to FIG. 9*b*—as shown in FIG. 11*b* or FIG. 21—a spring lock or latch 430 may be provided—especially at exactly one position—by means of which a reference position can be detected, for example, via the evaluation of the torque or torque curve in a controller or control device.

In both the variation according to FIG. 9a and the variation according to FIG. 9b, it is provided in particular that an incremental sensor is provided and is provided, for example, in the area of the output shaft of the electric motor. In this context it is provided in particular that absolute positions are detectable via a reference position in the displacement changes indicated by the incremental sensor. If the reference position is lost in the controller, it can in particular be determined in one of the aforementioned ways.

A backward select movement into an undesired gear can in particular be prevented via the extra locks or openings 386 (see FIG. 15) that are provided or in cooperation with a detent pawl or spring element 380 with tongue 388 if the turning for the selection has occurred in an inadequate or imprecise way. This occurs in particular in an area to which arrow 440 points in FIG. 15 or a corresponding area in the circumferential direction (at a recess or an opening 386). In this manner a locking position or a locking state is produced in or for the shift movement.

Figure 22:
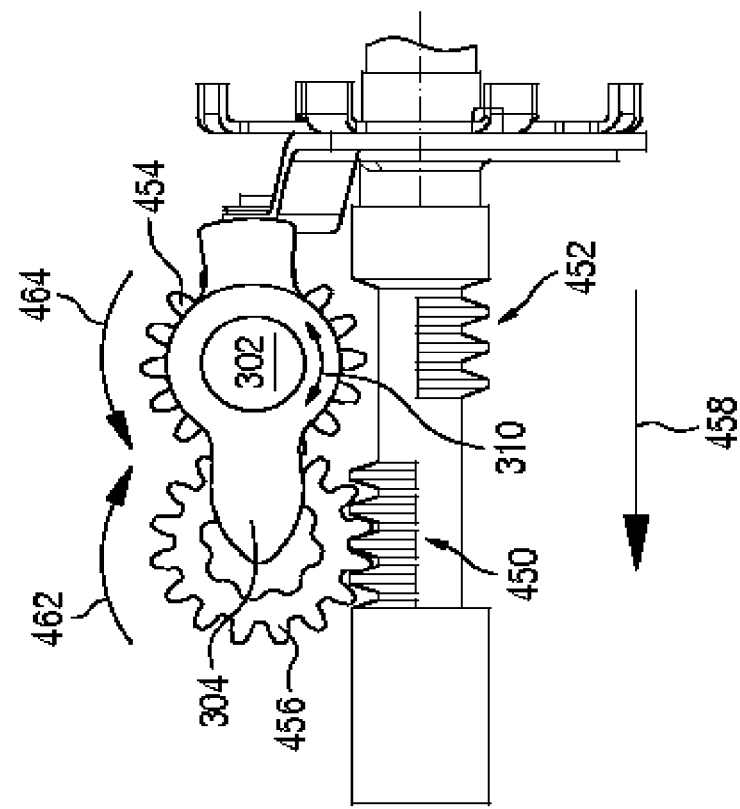
Figure 23:
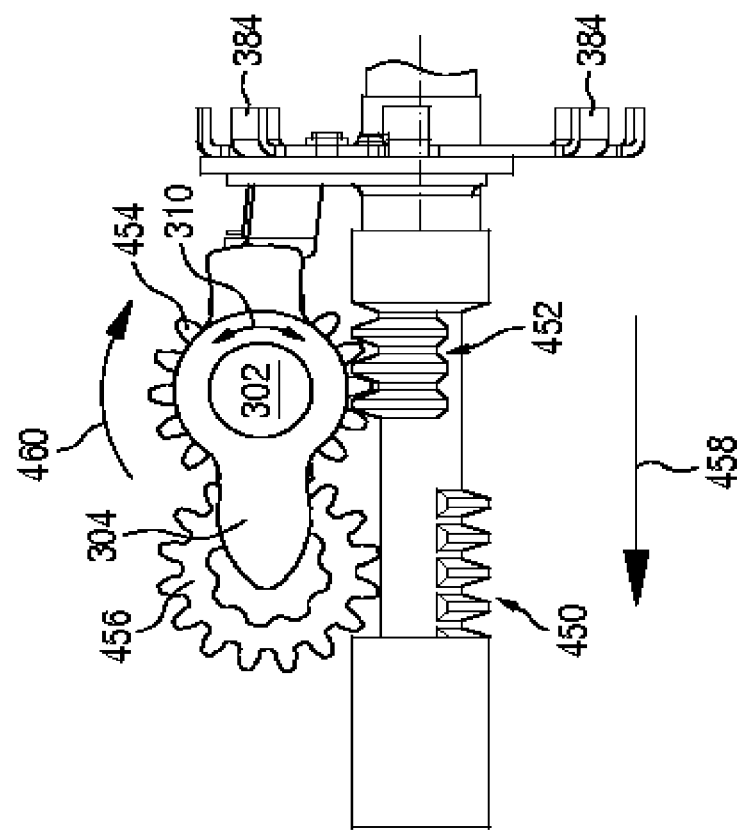
Figure 24:
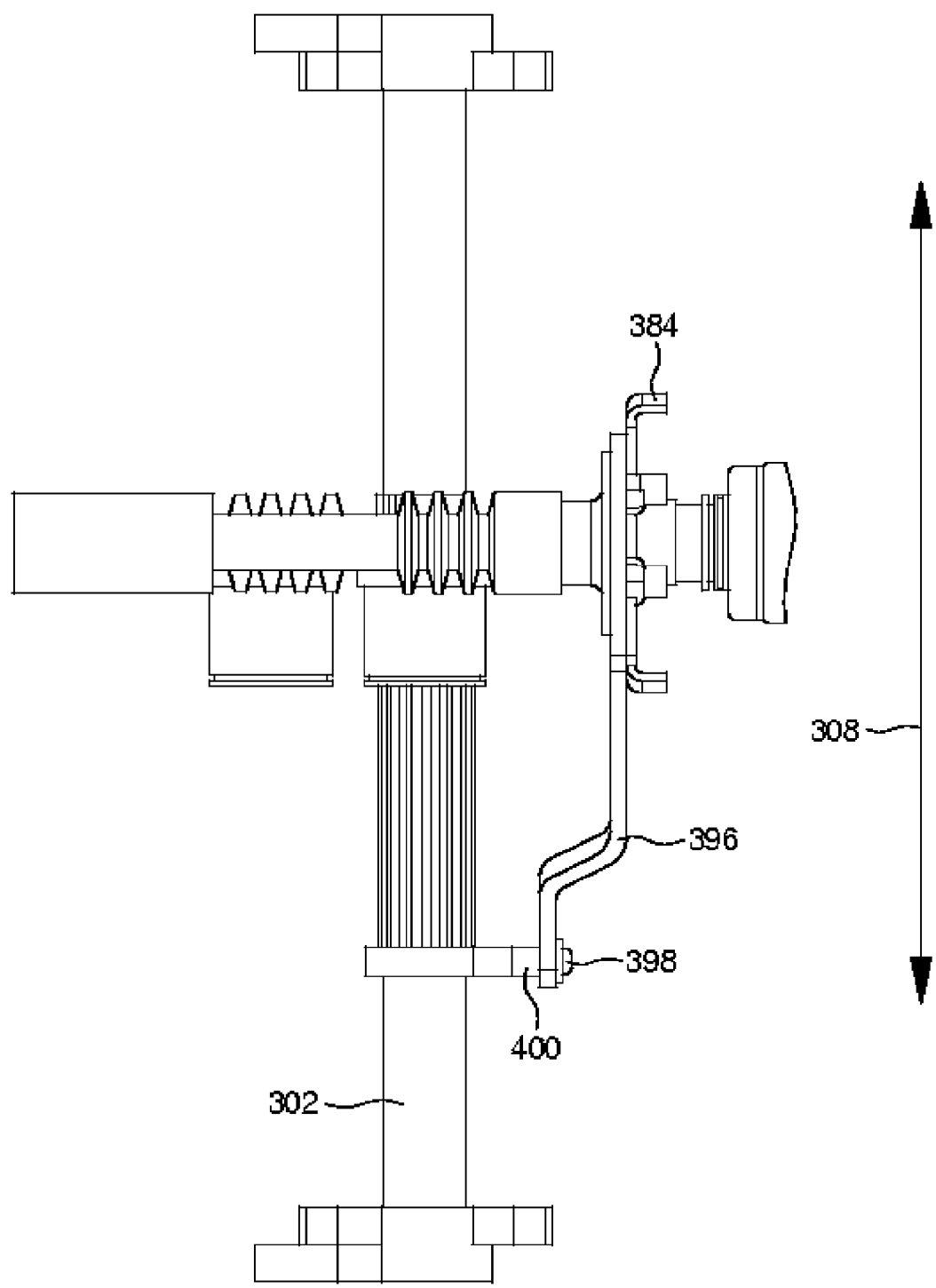

FIGS. 22 to 24 partially show views of another exemplary embodiment of an actuating apparatus 300 according to the invention. The embodiment according to FIGS. 22 or 24 may essentially be designed in such a manner as was explained in reference to FIGS. 9a to 21 (both versions), the design according to FIGS. 22 to 24, however, differing from the design according to FIGS. 9a to 21 in particular regarding the operation of the shift movement of shift finger 304 or 306.

In the design according to FIGS. 22 to 24, the spindle nut or the sleeve connected thereto is designed differently than the design according to FIGS. 9a to 21. There, specifically toothed rack sections 450, 452—in this case two—are disposed with axial spacing and offset from each other around the perimeter, e.g., in particular by 180°. Swiveling levers 354, 356 are missing in this case. The swiveling of shifter shaft 302 or of shift finger 304 or 306 in opposite directions from the neutral position may occur in the design according to FIGS. 22 to 24 by the cooperation of a gear wheel 454 mounted on shifter shaft 302 with toothed rack section 452 or by the cooperation of toothed rack section 450 with the gear wheel 456 that engages in gear 454 mounted on shifter shaft 302.

In a first swivel position in area of nut 332 or toothed rack sections 450, 452 (see FIG. 22), toothed rack section 452 engages in gear 454, which is disposed on shifter shaft 302, so that an axial displacement of nut 332 (starting from its stop position or the neutral position of shift finger 304 or 306) in relation to threaded spindle 330 (see explanations on FIGS. 9a to 21) in the direction of arrow 458 causes a swiveling of shift finger 304 or 306 in the direction of arrow 460. In this context, gear 456 is out of engagement with toothed rack section 450.

In a second swivel position area of nut 332 or toothed rack section 450, 452 (see FIG. 23), toothed rack section 450 engages in gear wheel 456 so that an axial displacement of nut 332 (starting from its stop position or the neutral position of shift finger 304 or 306) in relation to threaded spindle 330 (see explanations on FIGS. 9a to 21) in the direction of arrow 458 causes a swiveling of gear wheel 456 in the direction of arrow 462, So that this gear wheel 456 drives gear wheel 454 mounted on shifter shaft 302 in the opposite direction corresponding to arrow 464 via its engagement and accordingly causes a shift finger to swivel in the opposite direction compared to FIG. 22. In this context tooth 454 is out of engagement with toothed rack section 452.

The select movement or direction is that diagrammatically indicated in FIG. 24 by arrow 308.

As sensor projections 384 show in FIGS. 22 to 24, the design may be a sensor variation, but does not have to be.

REFERENCE NUMBER LIST

1 Actuating apparatus
10 Drive shaft or output shaft
12 Motor/electric motor
14 First rotational direction of 10
16 Second rotational direction of 10
18 Nut-threaded spindle assembly
20 Threaded spindle
22 Nut
24 Bearing
26 Longitudinal axis of 10, 20, 22
28 Positioning device
30 Control element/plate
32 Double arrow
34 Stop
36 Positioning element
38 Incremental displacement sensor
40 Thread of 20
42 Shift element
44 Shift element
46 Engagement area of 42
48 Swivel axis
50 First engagement area
52 First engagement area
54 Second engagement area
55 Engagement area
56 Additional positioning device
58 Collar of 56
60 Electronic control device
62 Dashed line
80 Plate of 56
82 Shift element
84 Shift element
86 Play or spacing
88 Interlock point or projection
90 Interlock point or projection
92 Interlock point or projection
94 Profiling
96 Profiling
98 Latching element
100 Profiling increase
102 Torsional lock or one-way clutch
102a a Direction in which positioning device 28 is loaded if drive shaft 10 is moved in a second direction
120 Threads of 22
122 Bearing of 20
124 Guide device
126 First shoulder
128 Second shoulder
130 Housing
132 Bushing
134 Arrow or moment
150 First part of 36
152 Second part of 36
154 Opening in 30
170 Step
172 Step
200 Actuating apparatus
200a Subassembly group 200b Subassembly group
200c Separating line
210a Drive shaft
210b Drive shaft
212a Electric motor
212b Electric motor
236a Positioning element
236b Positioning element
242a Shift element
242b Shift element
246a Engagement area
246b Engagement area
250a Master cylinder
250b Master cylinder
251a Pressure line
251b Pressure line
254a Engagement area
254b Engagement area
255a Engagement area
255b Engagement area
300 Actuating apparatus
302 Shifter shaft of 300
304 Shift finger of 302
306 Shift finger of 302
308 Double arrow (axial direction of 302)
310 Double arrow (swiveling direction of 302)
312 Drive device, electric motor
314 Housing
316 Support
318 Cover of 314
320 Holding area for 322 on 314
322 Hall sensor
330 Threaded spindle
332 Nut
334 Motor output shaft of 312
335 Gear set
336 Torsional lock for 332
338 Spline toothing of 336
340 Sleeve of 314
342 Spline of 338
344 Insertion tapers of 342
346 Spline or tooth of 332
348 Insertion taper of 346
350 Sleeve on 332
352 Second sleeve on 332
354 First swiveling lever
356 Second swiveling lever
358 Swiveling lever
360 Toothed quadrant of 354 or 356
362 Gear wheel on 364
364 Hollow shaft
365 Plain bearing bush
366 Spline toothing on 364
368 (counter) Toothing on 302
370 Arrow
372 Arrow
374 Sleeving device, spline toothing on 352
376 Eccentric
378 Sleeve-like section
380 Spring element
382 Disk
384 Projection on 382
384a Projection on 382
386 Recess or opening in 382
388 Tongue of 380
390 Catch
392 Eccentric disk of 376
394 Ring flange
396 Guide lever
398 Bolt on 400
400 Sleeve on 302
404 Arrow
410 Engagement area 350 for 354, 356
412 Arrow
414 Arrow
420 Secondary actuation element
430 Latching
440 Arrow
450 Tooth section
452 Tooth section
454 Gear wheel on 302
456 Gear wheel
458 Arrow
460 Arrow
462 Arrow
464 Arrow

We claim:

1. An actuating apparatus (1) for the impingement of at least two shift elements (42, 44) that are spaced apart from each other, each having at least a first engagement area (50, 52) for its actuation, comprising:
    a drive shaft (10) arranged to be driven by a motor in both rotational directions;
    the drive shaft (10) having a first thread profile (20);
    a positioning device (28) screwed onto the first thread profile (20) of the drive shaft (10) via a second thread profile (22) that is complementary to the first thread profile (20); and,
    a control element (30) that is connected to the positioning device (28) in a rotationally fixed manner which causes the positioning device (28) to be turned with the drive shaft (10) when the drive shaft (10) turns in a first rotational direction, at least one second engagement area (54) provided on the positioning device (28) being positioned on at least one first engagement area (50, 52) of at least one shift element (42, 44);
    wherein the control element (30) controls an axial displacement of the positioning device (28) in relation to the drive shaft (10) when the drive shaft (10) turns in a second rotational direction that is opposite the first rotational direction and with it an actuation of the at least one shift element (42, 44), on whose first engagement area (50, 52) the second engagement area (54) is positioned.

2. The actuating apparatus (1) as described in claim 1, wherein the axial displacement between the positioning device (28) and the drive shaft (10) is limited so that, when the drive shaft (10) is turned in the first rotational direction, the positioning device (28) is entrained in the rotational direction after reaching the maximum displacement.

3. The actuating apparatus (1) as described in claim 2, wherein the axial displacement of the positioning device (28) relative to the drive shaft (10) is limited by a stop (34).

4. The actuating apparatus (1) as described in claim 2, wherein, when the drive shaft (10) turns in the first rotational direction, a braking device (174), whose braking force is greater than a frictional force occurring between drive shaft (10) and positioning device (28) during turning is operative on control element (30).

5. The actuating apparatus (1) as described in claim 1, wherein, when the drive shaft (10) turns in a second rotational direction, the control element (30) is inhibited from turning at a position set beforehand.

6. The actuating apparatus (1) as described in claim 5, wherein the inhibition is caused by a torsional lock (102).

7. The actuating apparatus (1) as described in claim 5, wherein an inhibition is provided for at least one position between a first and second engagement area.

8. The actuating apparatus (1) as described in claim 1, wherein at least two shift elements (42, 44) are operated one after the other when there is a relative movement between drive shaft (10) and shifting device (28).

9. The actuating apparatus (1) as described in claim 1, wherein at least one shift element (42, 44) effects an engagement of a gear of an automated transmission.

10. The actuating apparatus (1) as described in claim 1, wherein at least one shift element (42, 44) operates a friction clutch in the drive train of a motor vehicle.

11. A motor vehicle transmission having an actuating apparatus (1) as described in claim 1.

12. The motor vehicle transmission as described in claim 11, wherein this motor vehicle transmission is automatically controlled.

13. A use of an actuation device (1) as described in claim 1 for the control of gear change operations in a motor vehicle transmission as a shift and actuation apparatus (1) of a motor vehicle transmission or a friction clutch.

14. An actuating apparatus having a rotatably mounted drive shaft (10), said drive shaft (10) being movable about its longitudinal axis (26) in both rotational directions, namely in a first rotational direction (14) and a second rotational direction (16) opposite the first, and having a nut/threaded spindle assembly (18) that has a threaded spindle (20) and a nut (22) whose thread (120) engages the thread (40) of the threaded spindle (20), it being possible for the part of this nut/threaded spindle assembly (18), that faces or is closer to the drive shaft (10) in the power flow, that is, the threaded spindle (20) or the nut (22), to be rotationally driven by the drive shaft (10), and the other part of the nut/spindle assembly (18), that is, the nut (22) or the threaded spindle (20), being coupled to a positioning device (28), especially fixedly coupled, so that the axial position of the positioning device (28) that is designed in the direction of the longitudinal axis (26) of the nut (22) or the threaded spindle (20) may be changed, a stop (34) being provided that limits the axial mobility of the positioning device (28) in the one orientation of the axial direction and it being possible to run up against stop (34) via turning of the drive shaft (10) in a first rotational direction (14), and this stop (34) causing the positioning device (28) to be moved in an essentially purely rotary or swiveling manner after the stop (34) is reached and the drive shaft (10) continues its rotary movement in the first rotational direction (14), and the positioning device (28) being designed in a rotationally asymmetric manner with respect to the rotary axis or swivel axis (26) that is assigned to this movement and/or has a positioning element (36) disposed in a rotationally asymmetric manner with respect to this rotary or swivel axis (26), the position of this positioning element (36) in the rotational direction being changed during its purely rotational or purely swiveling movement and at least one torsional lock that acts in one direction or at least one one-way clutch (102) acting in one direction being provided that can hold it in at least two rotary or swivel positions of the positioning device (28) in such a manner that in each of these holding positions, acting in one direction, a rotation or swiveling of the positioning device (28) about the rotary or swivel axis (26) is prevented if the drive shaft (10) is driven in the second rotational direction (16) so that the positioning device (28) in each case is then moved in an axial or translatory manner, when the rotary position remains the same, if the drive shaft (10) is driven in the second rotational direction (16) or is driven further.

15. The actuating apparatus as described in claim 14, having drive device (12) and having a positioning device (28) disposed so as to be movable in relation to this drive device (12) and moveable by the drive device (12), the position of the positioning device (28) being changeable in the rotational or swiveling direction and the position of the positioning device (28) being changeable in the axial direction or in the direction of a rotational or swivel axis assigned to this rotational or swiveling direction, wherein the drive device (12) has exactly one electric motor (12), with an output shaft (10) rotationally driven by the electric motor (12) and the positioning device (28) is driven via this output shaft (10) both to produce the positional change of the positioning device (28) in the rotational or swivel direction and to produce the positional change of the positioning device (28) in the axial direction or in the direction of the rotational or swivel, axis, and the position of the positioning device (28) in the rotational or swiveling direction in at least one position of the positioning device (28) being changeable essentially as a function of a positional change in the axial direction, or in the direction of the rotational or swivel axis via the electric motor (12) or its output shaft (10), and the positioning device (28) can be moved via this output shaft (10) in an essentially purely translatory manner in different rotational or swivel positions in the axial direction, or in the direction of the rotational or swivel axis and/or the positioning of the positioning device (28) in the axial direction, or in the direction of the rotational or swivel axis, being changeable in at least one position of the positioning device (28) essentially independently of a positional change in the rotational or swivel direction and it being possible to move the positioning device (28) in an essentially purely rotational or swiveling manner in each of the different axial positions via the output shaft (10).

16. The actuating apparatus as described in claim 14, for a motor vehicle transmission, said motor vehicle transmission having a plurality of gear steps with different ratios, it being possible to change a gear or the gear selected in the power or torque flow of the motor vehicle transmission using an actuating apparatus (1), this actuating apparatus (1) producing positioning movements during operation that enable this gear change and these positioning movements further being such that it is possible to shift from at least one selected gear step, alternatively, into at least three different other gears, that is, without it being necessary in the meantime to select or run through an additional gear, wherein the actuating apparatus (1) has exactly one electric motor (12) that effects all positioning movements of the actuating apparatus (1).

17. The actuating apparatus as described in claim 14, wherein the par (20) of the nut/threaded spindle (18) that faces or is situated closer to the drive shaft (10) in the power flow is the threaded spindle (20), and the other part (22) of the nut/threaded spindle assembly (18) is the nut (22).

18. The actuating apparatus as described in claim 14, wherein the actuating apparatus (1) has exactly one electric motor (12) with an output shaft (10) that is driven in a rotational manner during operation, this output shaft (10) being the drive shaft (10), and the electric motor (12) alternatively being driven or switched in such a manner that this output shaft (10) is loaded and driven in a first rotational direction (14) or in a second rotational direction (16) opposite the first one.

19. The actuating apparatus as described in claim 14, wherein the actuating apparatus (1) is a motor vehicle transmission actuating apparatus (1) or a component of a motor vehicle transmission actuating apparatus (1) by means of which gears of a motor vehicle transmission can be changed.

20. The actuating apparatus as described in claim 14, wherein the torsional lock, acting in one direction, or the one-way clutch (102), acting in one direction, for a plurality of gears that can be engaged in a motor vehicle transmission, and for each gear, each as a separate locking position so that the positioning device (28) is held in a predetermined rotational position in each case or upon reaching this rotational position is held in this rotational position if the drive shaft (10) is driven in the second rotational direction (16).

21. The actuating apparatus as described in claim 20, wherein the positioning device (28) in these particular holding or lock positions of the torsional lock or the one-way clutch (102) is moved in the axial direction in a purely translatory manner, if drive shaft (10) is driven in the second rotational direction (16) or is driven further, and, a positioning element (36) of the positioning device (28) is moved in an essentially translatory manner and engages in a shift element (42, 44, 82, 84), and by this engagement and in some case at least one intermediately connected element, effects a synchronization in the motor vehicle transmission and/or a shift into a gear of the motor vehicle transmission, the stop or swiveling position being held by the torsional lock or the one-way clutch (102) being assigned to this gear.

22. The actuating apparatus as described in claim 14, wherein by rotation of the drive shaft in the first rotational direction (14) a gear of a motor vehicle transmission can be selected by a further rotation or swiveling of the drive shaft in this first rotational direction (14) after driving against the stop (34).

23. The actuating apparatus as described in claim 22, wherein the selected gear can be shifted via a rotation of the drive shaft (10), subsequent to the selection, in the second rotational direction (16) of the drive shaft (10).

24. The actuating apparatus as described in claim 14, wherein the stop (34) is fixedly mounted on the threaded spindle (20).

25. The actuating apparatus as described in claim 14, wherein a plurality of shift elements (42, 44), are provided that can be operated by the positioning device (28).

26. The actuating apparatus as described in claim 25, wherein the swiveling levers (42, 44) and a swiveling axis (48) of the swiveling levers (42, 44) are positioned in such a manner that, when there is a translatory movement of the positioning device (28) and when rotational mobility of the positioning device (28) is blocked via the torsional lock that acts in one direction or via the one-way clutch (102) that acts in one direction, a positioning element (36) is moved onto an engagement area (50, 52, 54) of a swiveling lever (42, 44) and loads it when the engagement area (50, 52, 54) is loaded, it being possible to load each of the swiveling levers (42, 44)—at each corresponding or adapted rotational position of the positioning device (28)—by this or any positioning element (36) of the positioning device (28), in order to effect engagement of a particular assigned gear of a motor vehicle transmission via this loading.

27. The actuating apparatus as described in claim 26, wherein at least one swiveling lever (42, 44) can be loaded or operated via the positioning device (28) in both swiveling directions.

28. The actuating apparatus as described in claim 14, wherein the positioning device (28) has a plate (30), on which a positioning element (36) is disposed, which is designed as a bolt.

29. The actuating apparatus as described in claim 14, wherein at least one elastic element, is provided and this elastic element (156) is loaded if there is synchronization via the actuating apparatus (1) within the context of engaging a gear in a motor vehicle transmission.

30. The actuating apparatus as described in claim 29, wherein the elastic element is a spring (156) and the positioning device (28) has a plate (30) and a positioning element (36), as well as a bolt or pin, this spring (156) being supported on one side against the positioning element (36) and in the other side against the plate (30).

31. The actuating apparatus as described in claim 14, wherein a neutral position is assigned to each swiveling lever (42, 44) and an additional positioning device (56) is provided that moves predetermined swiveling levers (42, 44) into this neutral position if the positioning device (28) is moved onto the swiveling lever (42, 44), and specifically before the positioning device (28) operatively engages in one of the swiveling levers (42, 44) for the engagement of the gear in a motor vehicle transmission and/or to trigger a synchronization in the motor vehicle transmission.

32. The actuating apparatus as described in claim 31, wherein the additional device (56) is firmly connected to the positioning device (28).

33. The actuating apparatus as described in claim 31, wherein the swiveling levers (42, 44) each have at least two projections (50, 52, 54) directed in the direction of the positioning device (28) or the additional positioning device (56), and a swiveling axes (48) of the swiveling lever (42, 44) are disposed in such a manner that one of these projections (50, 52, 54) is moved outside the neutral position of the particular swiveling lever (42, 44) in an excursion in the direction of positioning device (28) or the additional positioning device (56) and the other in the direction which is directed away from this positioning device (28) or additional positioning device (56), and that the additional positioning device (56), when the pertinent swiveling lever (42, 44) is moved into the neutral position, first loads the projection (50, 52, 54) that is moved in an excursion in the direction of the positioning device (28) or the additional positioning device, the additional positioning device (56) being able to engage between the projections (50, 52, 54) of the same swiveling lever (42, 44) and engages during or shortly before reaching the neutral position of the relevant swiveling lever (42, 44).

34. The actuating apparatus as described in claim 31, wherein the additional positioning device (56) has a collar (58) and/or has or is a plate (80).

35. The actuating apparatus as described in claim 31, wherein the additional positioning device (56) has at least one recess that enables the swiveling lever (42, 44) to be actuated is swiveled into this recessed area or is not blocked in its swiveling movement by the additional positioning device (56).

36. The actuating apparatus as described in claim 14, wherein at least one displacement detection device (38) is provided and a displacement detection device (38) having an incremental displacement sensor.

37. The actuating apparatus as described in claim 36, wherein at least one displacement detection device (38) is provided that detects the rotational position of the positioning device (28), the positioning device (28) blocked by the stop (34) in at least one position also being blocked in the opposite direction from movement, so that this position can be used to calibrate the displacement meter (38).

38. The actuating apparatus as described in claim 14, wherein the positioning device (28) in its relative movement is supported against a housing (130) and via shoulders that engage within each other, of which one is disposed on the positioning device (28) and one is disposed on the housing (130), and between which is positioned a bearing bush (132).

39. The actuating apparatus as described in claim 14, wherein, by turning the drive shaft or output shaft (10) in the first rotational direction (14), gears in a motor vehicle transmission can be selected, the positioning device (28) in the selection being moved in an essentially purely rotational manner, and by turning the drive shaft or output shaft (10) in the second rotational direction (16), which is opposite the first (14), the gear that is selected at the time can be shifted or is shifted.

40. The actuating apparatus as described in claim 14, wherein an electronic control device (60) is provided, and this electronic control device (60) drives an electric motor (12).

* * * * *